(12) United States Patent
Graham et al.

(10) Patent No.: US 8,197,901 B2
(45) Date of Patent: Jun. 12, 2012

(54) IN-SITU NANOPARTICLE FORMATION IN POLYMER CLEARCOATS

(75) Inventors: Ursula M. Graham, Lexington, KY (US); Rajesh Khatri, McLean, VA (US); Burt H. Davis, Georgetown, KY (US)

(73) Assignee: University of Kentucky, Lexington, KY (US)

( * ) Notice: Subject to any disclaimer, the term of this patent is extended or adjusted under 35 U.S.C. 154(b) by 937 days.

(21) Appl. No.: 11/778,324

(22) Filed: Jul. 16, 2007

(65) Prior Publication Data
US 2009/0022995 A1    Jan. 22, 2009

(51) Int. Cl.
*B05D 3/02* (2006.01)
(52) U.S. Cl. ..................................... 427/384; 427/385.5
(58) Field of Classification Search .................. None
See application file for complete search history.

(56) References Cited

U.S. PATENT DOCUMENTS

| | | | |
|---|---|---|---|
| 5,316,791 A | 5/1994 | Farber et al. | |
| 5,853,809 A | 12/1998 | Campbell et al. | |
| 6,383,641 B1 | 5/2002 | Kondou et al. | |
| 6,387,519 B1 | 5/2002 | Anderson et al. | |
| 6,436,167 B1 | 8/2002 | Chow et al. | |
| 6,455,746 B1 | 9/2002 | Dubois et al. | |
| 6,699,507 B1 | 3/2004 | Albrecht et al. | |
| 6,710,103 B2 | 3/2004 | Norris et al. | |
| 6,712,997 B2 * | 3/2004 | Won et al. | 252/503 |
| 6,819,692 B2 | 11/2004 | Klimov et al. | |
| 6,861,475 B2 | 3/2005 | Ilenda et al. | |
| 6,869,545 B2 | 3/2005 | Peng et al. | |
| 6,896,958 B1 | 5/2005 | Cayton et al. | |
| 6,916,368 B2 | 7/2005 | Vanier et al. | |
| 6,951,666 B2 | 10/2005 | Kodas et al. | |
| 7,053,149 B2 | 5/2006 | Anderson et al. | |
| 7,101,618 B2 | 9/2006 | Coggio et al. | |
| 7,122,253 B2 | 10/2006 | Yamaguchi et al. | |
| 7,144,627 B2 | 12/2006 | Halas et al. | |
| 7,147,712 B2 | 12/2006 | Zehnder et al. | |
| 7,150,910 B2 | 12/2006 | Eisler et al. | |
| 7,165,839 B2 | 1/2007 | Winterton et al. | |
| 7,344,583 B2 * | 3/2008 | Wendland et al. | 75/343 |
| 2001/0002275 A1 * | 5/2001 | Oldenburg et al. | 427/214 |
| 2002/0176927 A1 * | 11/2002 | Kodas et al. | 427/8 |

(Continued)

FOREIGN PATENT DOCUMENTS
WO    WO 2005/101427    * 10/2005

OTHER PUBLICATIONS
Zhou et al, Physica, E 33, pp. 28-34, available online Mar. 20, 2006.*

(Continued)

*Primary Examiner* — Erma Cameron
(74) *Attorney, Agent, or Firm* — Gifford, Krass, Sprinkle, Anderson & Citkowski, P.C.

(57) ABSTRACT

Methods and compositions for forming a transparent clear coat characterized by a desired property, such as a color effect, resistance to UV light-induced degradation and/or scratch resistance, on a substrate are detailed according to embodiments of the present invention. Particular compositions and methods for producing a transparent clear coat layer include nanoparticles formed in-situ during curing of a transparent clear coat. Curable clear coat compositions are described according to embodiments of the present invention which include one or more substantially dissolved nanoparticle precursors.

13 Claims, 8 Drawing Sheets

U.S. PATENT DOCUMENTS

| | | |
|---|---|---|
| 2004/0079195 A1 | 4/2004 | Perry et al. |
| 2005/0056118 A1 | 3/2005 | Xia et al. |
| 2006/0060998 A1 | 3/2006 | Strouse et al. |
| 2006/0197953 A1 | 9/2006 | Perez et al. |
| 2009/0047512 A1* | 2/2009 | Conroy .......................... 428/338 |

OTHER PUBLICATIONS

Song, C., D. Wang, Y. Lin, Z. Hu, G. Gu, and X. Fu. "Formation of silver nanoshells on latex spheres." Nanotechnology, 2004, vol. 15, pp. 962-965.

Kim, J., D. Shin; and K. Ihn. "Synthesis of Poly(urethane acrylate-*co*-styrene) Films Containing Silver Nanoparticles by a Simultaneous Copolymerization/in situ Electron Transfer Reaction." Macromolecular Chemistry and Physics, 2005, vol. 206, pp. 794-801.

Fritzche, W., H. Porwol, A. Wiegand, S. Bornmann, J.M. Kohler. "In-Situ Formation of Ag-Containing Nanoparticles in Thin Polymer Films." NanoStructured Materials, 1998, vol. 10, No. 1, pp. 89-97.

Faure, C., Derré, A., Neri, W., "Spontaneous Formation of Silver Nanoparticles in Multilamellar Vesticles." J. Phys. Chem. B, 2003, 107, pp. 4738-4746.

* cited by examiner

IN-SITU NANOPARTICLE FORMATION IN POLYMER CLEARCOATS

FIELD OF THE INVENTION

The invention relates generally to compositions and methods for forming a transparent coating having a color effect and/or protective properties including scratch resistance or UV resistance on a substrate.

BACKGROUND OF THE INVENTION

Clear coat compositions are used in industry to coat articles and provide a colorless protective and/or glossy layer. Where a color effect is desired, a separate layer including a pigment is commonly used. In some cases, powdered or nanopowder pigments are mixed into a coating material to provide a color effect, scratch resistance and/or UV-protection. However, production of nanopowders is complex. Additionally, exogenously produced nanopowders exhibit a tendency to agglomerate, forming larger particles and diminishing the advantageous properties of the nanoparticles. Previous approaches to incorporation of nanopowders into polymer formulations include chemical functionalization and dispersion of the exogenously produced nanoparticles into a polymer matrix, requiring further processing, as well as handling of materials by personnel responsible for particle generation and/or functionalization.

Thus, there is a continuing need for compositions and methods for forming a transparent coating layer to achieve desirable properties in the coating layer such as a desired color effect, scratch resistance and/or resistance to deleterious effects of UV light.

SUMMARY OF THE INVENTION

The present invention provides clear coat compositions for nanoparticle formation in-situ in polymer clear coats for enhancement of desirable properties including color, scratch resistance and/or resistance to deleterious effects of UV light. In particular embodiments of compositions and methods of the present invention, the complex steps of ex-situ formation of nanoparticles, also called exogenous formation herein, as well as addition and dispersion of nanopowders to form polymer-nanoparticle composites are eliminated.

A method of forming a transparent coating having a color effect, resistance to UV light-induced degradation and/or scratch resistance on a substrate is provided according to embodiments of the present invention. Particular embodiments of inventive methods include applying a curable clear coat composition having a first nanoparticle precursor dissolved therein such that the curable clear coat composition precursor is substantially free of undissolved first nanoparticle precursor. The curable clear coat composition is cured to form a transparent coating including a polymer and a first plurality of in-situ formed nanoparticles having an average particle size in the range of about 1-100 nanometers, inclusive, The first plurality of nanoparticles confers a color effect, resistance to UV light-induced degradation and/or scratch resistance to the transparent coating.

In general, in-situ formed nanoparticles which confer a color effect are characterized by a plasmon resonance absorption in the visible range.

In certain embodiments of methods of the present invention, the first nanoparticle precursor is a metal salt. In further particular embodiments, the first nanoparticle precursor is a metal salt capable of being reduced under clear coat composition curing conditions to elemental metal. Additionally provided by the present invention are embodiments in which the first nanoparticle precursor is a metal salt capable of forming a metal oxide under clear coat composition curing conditions. Such metal oxides illustratively include alumina, silica, ceria, titania, an iron oxide, and combinations of these or other metal oxides.

For example, the first nanoparticle precursor includes a metal such as, but not limited to, Al, Au, Ag, Bi, Ce, Cr, Co, Cu, Fe, Mn, Ni, Pt, Sb, Se, Si, Sn, Ti and Zn.

In particular embodiments of methods and compositions of the present invention the first nanoparticle precursor is $HAuCl_4$.

In further embodiments, the first nanoparticle precursor is a silicate, such as tetramethylorthosilicate.

Particular embodiments of the present invention include a curable clear coat composition having a second nanoparticle precursor dissolved therein. For example, the first nanoparticle precursor is $HAuCl_4$ and the second nanoparticle precursor includes a metal such as Al, Au, Ag, Bi, Ce, Cr, Co, Cu, Fe, Mn, Ni, Pt, Sb, Se, Si, Sn, Ti or Zn.

Embodiments of curable clear coat compositions according to embodiments of the present invention include a first nanoparticle precursor, $HAuCl_4$, and a second nanoparticle precursor such as, but not limited to, selenium chloride, tin chloride, iron nitrate, antimony acetate, nickel nitrate, copper nitrate, cobalt nitrate, chromium nitrate, manganese nitrate, bismuth citrate, aluminum nitrate, tetramethylorthosilicate, titanium tetrabutoxide, and combinations of these or other nanoparticle precursors.

In certain embodiments, the first plurality of nanoparticles formed in-situ in a transparent coating of the present invention is a plurality of nanoparticles characterized by an amount of elemental metal in the range of 95-100% of the total weight of the plurality of nanoparticles and the first plurality of nanoparticles confers a color effect to the transparent coating.

In further embodiments, the first plurality of nanoparticles is a plurality of nanoparticles characterized by an amount of a metal oxide in the range of 95-100% of the total weight of the first plurality of nanoparticles and the first plurality of nanoparticles confers scratch resistance and/or resistance to UV light-induced degradation to the transparent coating.

Additionally provided by the present invention are embodiments in which a first nanoparticle precursor and a second nanoparticle precursor are dissolved in a curable clear coat composition and a first plurality of nanoparticles and a second plurality of nanoparticles are formed in-situ during curing of a curable clear coat composition. The first plurality and the second plurality of nanoparticles are each independently metal nanoparticles or metal oxide nanoparticles.

Particular embodiments of an inventive method of the present invention include curable clear coat composition containing a first nanoparticle precursor and a second nanoparticle precursor dissolved in a curable clear coat composition and a first plurality of nanoparticles formed in-situ during curing of a curable clear coat composition wherein the first plurality of nanoparticles includes individual nanoparticles containing two metals or metal oxides.

The second nanoparticle precursor is preferably substantially dissolved in the curable clear coat composition in certain embodiments of methods and compositions of the present invention.

It is further preferred that the curable clear coat composition is substantially free of nanoparticles prior to onset of curing and that the cured clear coat composition therefore contains nanoparticles formed in-situ during curing and not nanoparticles formed exogenously.

In particular embodiments, nanoparticles are substantially uniformly dispersed throughout a transparent coating formed according to methods of the present invention.

Described herein is an embodiment of the present invention in which a curable clear coat composition includes a metal salt nanoparticle precursor and a metal oxide nanoparticle precursor, the transparent coating includes a first plurality of metal oxide nanoparticles and a second plurality of elemental metal nanoparticles, and the formed transparent coating is characterized by a color effect and by resistance to UV light-induced degradation and/or scratch resistance.

A composition is described herein according to embodiments of the present invention for forming a transparent coating layer on a substrate, the transparent coating layer having a color effect and/or scratch resistance on the substrate. A curable clear coat included in preferred embodiments of compositions of the present invention has a first nanoparticle precursor substantially dissolved therein. In additional embodiments, a second nanoparticle precursor is present in the curable clear coat.

The first nanoparticle precursor and/or the second nanoparticle precursor is a metal salt in particular embodiments of a composition of the present invention. For example, the first nanoparticle precursor and/or the second nanoparticle precursor includes a metal such as, but not limited to, Al, Au, Ag, Bi, Ce, Cr, Co, Cu, Fe, Mn, Ni, Pt, Sb, Se, Sn, Ti or Zn.

In further embodiments, the first nanoparticle precursor and/or the second nanoparticle precursor is a silicate.

In particular embodiments of methods and compositions of the present invention the first nanoparticle precursor is $HAuCl_4$.

A composition for forming a transparent coating layer on a substrate is provided according to embodiments of the present invention which includes a curable clear coat material including a first nanoparticle precursor, wherein the precursor includes a metal such as Al, Au, Bi, Ce, Cr, Co, Cu, Fe, Mn, Ni, Pt, Sb, Se, Sn, Ti or Zn.

An article including a substrate having a transparent coating on at least one surface of the substrate is detailed herein according to embodiments of the present invention wherein the transparent coating includes a cured clear coat polymer and a plurality of in-situ formed nanoparticles. The transparent coating confers a color effect, resistance to UV light-induced degradation and/or scratch resistance to the substrate.

In particular embodiments, the substrate is an automotive body panel.

Optionally, the substrate includes a multilayer laminate. A particular multilayer laminate of the present invention includes at least an innermost primer layer adjacent the substrate and an outermost coating layer, wherein the transparent coating is the outermost layer.

Additional configurations of a multilayer laminate are contemplated as within the scope of the present invention. For example, more than one layer of a transparent coating of the present invention may be included.

Embodiments of the present invention provide for use of a curable clear coat composition including a nanoparticle precursor for forming a transparent coating layer on a substrate wherein the transparent coating has a color effect, resistance to UV light-induced degradation and/or scratch resistance.

DETAILED DESCRIPTION OF THE PREFERRED EMBODIMENTS

Figure 1:
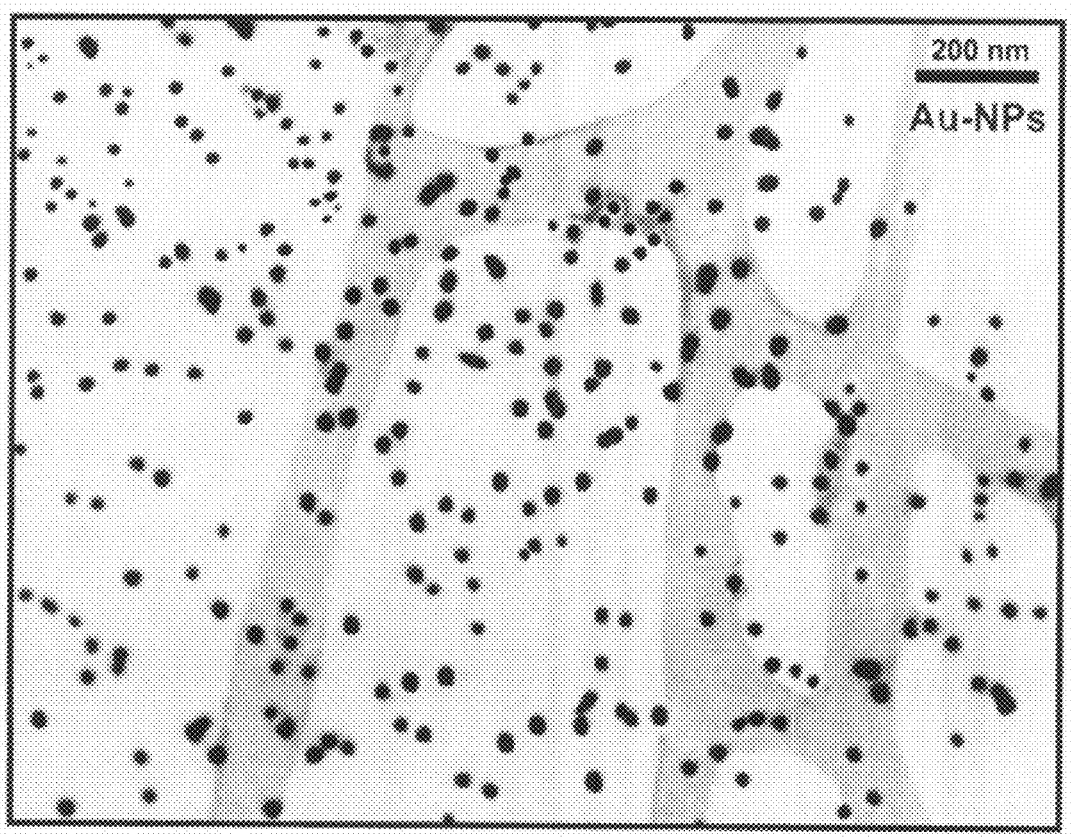
FIG. 1 shows a TEM image of a region of the sample of transparent cured material including in-situ formed nanoparticles.

Methods and compositions for forming a transparent coating having one or more desirable characteristics provided at least in part by nanoparticles formed in-situ during curing of the coating are provided according to embodiments of the present invention. Particular desirable effects conferred by in-situ formed nanoparticles include a color effect, scratch resistance and/or resistance to deleterious effects of UV light.

The term "in-situ" as applied herein to formation of nanoparticles refers to formation of nanoparticles in a curable clear coat resin composition during curing of the curable clear coat resin composition.

The term "nanoparticles" refers to particles having a particle size in the range of about 1-100 nm, inclusive. Nanoparticles formed in-situ have any of a variety of shapes, illustratively including substantially spherical, cubic, tetragonal, hexagonal, trigonal, octagonal, irregular and flake.

In particular embodiments, the particle size of nanoparticles formed in-situ is relatively narrow in range. Thus, for example, nanoparticles formed in-situ during curing of a clear coat composition have a particle size in the range of about 1-10 nm, inclusive, about 5-10 nm, inclusive, about 10-30 nm, inclusive, about 20-50 nm, inclusive, or about 5-70 nm, inclusive.

Broadly described, compositions for forming a transparent coating having one or more desirable characteristics provided at least in part by nanoparticles formed in-situ during curing of the coating include at least one nanoparticle precursor dissolved in a curable clear coat composition.

A nanoparticle precursor is a metal compound, including inorganic and/or organic metal compounds.

In particular embodiments, a nanoparticle precursor is a metal salt. The term "metal salt" as used herein refers to a compound including at least one anion and at least one cation wherein at least either the anion or cation includes a metal. An anion and/or cation included in a metal salt may be monatomic or polyatomic. Illustrative non-limiting examples of monatomic anions and cations include $Au^{3+}$, $Al^{3+}$, $Cl^-$, $NO_3^-$, $CH_3C(O)O^-$, and $Sn^{2+}$.

A metal in a metal compound which is a nanoparticle precursor may be any metal, illustratively including a transition metal or metal of the "main group" of the Periodic Table of Elements. Particular metals included in a metal compound such as a metal salt include, but are not limited to, Al, Au, Ag, Bi, Ce, Cr, Co, Cu, Fe, Mn, Ni, Pt, Sb, Se, Si, Sn, Ti and Zn.

Illustrative non-limiting examples of metal compounds which are nanoparticle precursors include metal acetates, citrates, formates, propionates, oxalates, cyanides, fluorides, chlorides, borates, hydroxides, carbonates, chlorides, nitrates, oxides, alkoxides, sulphates, phosphates and acetylacetonates.

A metal alkoxide is metal salt which is a nanoparticle precursor in particular embodiments of the present invention. For example, a silicon alkoxide is a metal salt nanoparticle precursor in particular embodiments. Specific examples of silicon alkoxides include tetramethylorthosilicate (TMOS), tetraethylorthosilicate, tetrapropylorthosilicate and tetrabutylorthosilicate.

The term "clear coat" refers to a cured transparent layer of polymer resin. A clear coat is generally applied to a substrate to protect the substrate, for example, from the effects of weather exposure. A clear coat is frequently applied over a layer of pigmented material, such as a basecoat of paint.

A clear coat is commonly used in the automotive industry to protect various automotive surfaces and particularly to protect painted surfaces and provide gloss. Conventional clear coats are colorless when cured. In contrast, a transparent clear coat of the present invention has a color due to in-situ formed nanoparticles in particular embodiments.

Prior to curing, a clear coat is referred to herein as a "curable clear coat composition."

Concentrations of a nanoparticle precursor in a curable clear coat composition are generally in the range of about 0.01 millimolar-100 millimolar, inclusive. Further, more than one nanoparticle precursor is optionally included in a curable clear coat composition. Where more than one nanoparticle precursor is present in a curable clear coat composition each nanoparticle precursor independently has a concentration in the range of about 0.01 millimolar-100 millimolar, inclusive. However, concentrations of a nanoparticle precursor are not limited to concentrations in this range and may be higher or lower depending on the desired properties of a transparent coating and the particular application.

In-situ formed nanoparticles are present in a transparent clear coat layer of the present invention in amounts which confer a desired beneficial characteristic such as a color effect, scratch resistance and/or resistance to deleterious effects of UV light. In general, a desired beneficial characteristic is conferred where in-situ formed nanoparticles are present in a transparent clear coat layer of the present invention in amounts in the range of about 0.01%-30%, inclusive, by weight, of the cured transparent clear coat composition.

Color Effect

In particular embodiments, methods are provided for forming a transparent coating having a color effect which includes nanoparticles formed in-situ during curing of the coating. The in-situ formed nanoparticles are characterized by a plasmon resonance absorption maximum in the visible range such that the cured transparent coating including the nanoparticles has a color effect.

A method of forming a transparent coating having a color effect according to the present invention is "tunable" such that any of various desired color effects is provided by a transparent coating formed according to the present invention. For example, a transparent coating including in-situ formed nanoparticles is tunable to achieve colors illustratively including blues, reds, greens, yellows, browns, oranges, greys and purples of various intensities.

Nanoparticles formed in-situ during curing of a curable clear coat composition which confer a color effect in a cured transparent clear coat are elemental metal-containing nanoparticles in particular embodiments of the present invention. In particular embodiments, a nanoparticle formed in-situ is composed of substantially pure metal. In further embodiments, a nanoparticle formed in-situ is composed of greater than 90% metal. For example, nanoparticles formed in-situ during curing of a curable clear coat composition which confer a color effect in a cured transparent clear coat are gold, silver, bismuth, chromium, cobalt, copper, iron, manganese, nickel, platinum, antimony, selenium and tin nanoparticles.

A particular color effect in a transparent coating formed according to a method of the present invention depends on several factors, including the composition and size of nanoparticles, thickness of the coating and polymer curing parameters. Thus, a desired color effect is achieved by varying nanoparticle precursor identity and/or concentration in a curable clear coat resin composition in particular embodiments. A desired color effect is also achieved by use of particular curing conditions for curing a curable clear coat resin composition including one or more nanoparticle precursors.

In particular embodiments, a nanoparticle precursor included in a curable clear coat composition for forming a transparent coating having a color effect is a metal compound capable of being reduced to form metal nanoparticles. For example, nanoparticle precursors are reduced to form metal nanoparticles such as Au, Ag, Bi, Cr, Co, Cu, Fe, Mn, Ni, Pt, Sb, Se or Sn nanoparticles.

In still further embodiments, nanoparticles formed in-situ include combinations of metals. In particular embodiments, nanoparticles include combinations of one of more of: Au, Ag, Bi, Cr, Co, Cu, Fe, Mn, Ni, Pt, Sb, Se and Sn.

Specific examples of nanoparticle precursors illustratively include hydrogen tetrachloroaurate, selenium chloride, tin chloride, iron nitrate, antimony acetate, nickel nitrate, copper nitrate, cobalt nitrate, chromium nitrate, manganese nitrate and bismuth citrate.

Specific examples of curable clear coat compositions including more than one nanoparticle precursor for nanoparticles which confer a color effect are curable clear coat compositions including $HAuCl_4$ and a nanoparticle precursor selected from selenium chloride, tin chloride, iron nitrate, antimony acetate, nickel nitrate, copper nitrate, cobalt nitrate, chromium nitrate, manganese nitrate, and bismuth citrate. Additional non-limiting examples include any two or more nanoparticles selected from $HAuCl_4$, selenium chloride, tin chloride, iron nitrate, antimony acetate, nickel nitrate, copper nitrate, cobalt nitrate, chromium nitrate, manganese nitrate, and bismuth citrate.

In general, a color effect is observed where in-situ formed nanoparticles are present in a transparent clear coat layer of the present invention in amounts in the range of about 0.01%-30%, inclusive, by weight, of the cured transparent clear coat composition. In particular embodiments, a transparent clear coat layer having a color effect of the present invention includes in-situ formed nanoparticles in amounts in the range of about 0.01%-5%, inclusive, by weight, of the cured transparent clear coat composition In further particular embodiments, a transparent clear coat layer having a color effect of the present invention includes in-situ formed nanoparticles in amounts in the range of about 0.1%-1%, inclusive, by weight, of the cured transparent clear coat composition.

Scratch Resistance and Resistance to UV light-Induced Degradation

In further embodiments, nanoparticles are formed in-situ according to methods of the present invention to provide scratch resistant properties and/or resistance to UV light-induced degradation in a cured clear coat composition.

Thus, embodiments of an inventive transparent coating include a plurality of metal oxide nanoparticles formed in-situ and the transparent coating including the plurality of metal oxide nanoparticles is characterized by increased scratch resistance compared to a transparent coating without such nanoparticles.

Further embodiments of methods and compositions according to the present invention provide a transparent coating characterized by scratch resistance without addition of exogenously formed nanoparticles conferring scratch resistance. Examples of exogenously formed nanoparticles providing scratch-resistance include metal oxide nanoparticles, wherein the nanoparticles are formed and later mixed into a curable clear coat resin composition The term "scratch resistance" refers to a property of a cured coating which undergoes a mechanical insult of a type which generally results in removal of a portion of the coating material. A material having scratch resistance is characterized by removal of less material as a result of such a mechanical insult compared to a material without scratch resistance. A mechanical insult in this context is illustratively scraping or scrubbing with an abrasive material for instance. Scratch resistance may be measured by standard tests measuring differences in haze and/or loss of material following abrasion such as by use of a Taber Abraser and employing the Standard Test Method for Resistance of Transparent Plastics to Surface Abrasion, ASTM D1044-05, for example.

In particular embodiments, in-situ formed nanoparticles providing scratch resistance are oxide-containing nanoparticles, and particularly metal oxide and/or silicon oxide nanoparticles. In-situ formed nanoparticles present in a transparent coating of the present invention illustratively include nanoparticles of alumina, silica, titania, ceria, iron oxides or combinations of these or other metal oxides. Thus, in particular embodiments, a plurality of nanoparticles formed in-situ in a transparent coating of the present invention is characterized by an amount of alumina, silica, titania, ceria, iron oxides or combinations of these or other metal oxides in the range of about 95-100% by weight of the plurality of nanoparticles and the plurality of nanoparticles confers scratch resistance to the transparent coating.

In particular embodiments, a curable clear coat composition includes a nanoparticle precursor containing Al, Si, Ti, Ce, Fe or a combination thereof and a transparent coating formed by curing the composition is scratch resistant and includes in-situ formed alumina, silica, titania, ceria, or iron oxide nanoparticles or combinations of these. In particular embodiments, $AlNO_3$, TMOS, titanium-tetrabutoxide and/or $Fe(NO_3)_3$ is included in a curable clear coat composition and the transparent coating resulting from curing of the composition includes in-situ formed alumina, silica, titania, or iron oxide nanoparticles or combinations of these and is characterized by scratch resistance.

Multiple layers of a transparent coating including in-situ formed metal oxide and/or silicon oxide nanoparticles providing scratch resistance are optionally formed on a substrate.

In further embodiments, nanoparticles are formed in-situ to provide UV resistant properties to a cured composition. Thus, in a particular embodiment, a curable clear coat composition includes a nanoparticle precursor for producing a UV absorbing nanoparticle. More than one nanoparticle precursor for producing a UV absorbing nanoparticle is optionally included in a curable clear coat composition.

Examples of UV absorbing nanoparticles include, but are not limited to, titanium nanoparticles and zinc nanoparticles.

Characterization of a transparent coating as UV resistant is performed according to standard tests used to reproduce weathering effects that occur when the transparent coating is exposed to sunlight. For example, a sample is tested for changes in color, surface deterioration, gloss or texture following exposure to UV light for a period of time, such as 100-1000 hours.

In general, a scratch resistance and/or resistance to UV light-induced degradation in a cured clear coat composition is observed where in-situ formed nanoparticles are present in a transparent clear coat layer of the present invention in amounts in the range of about 0.1%-30%, inclusive, by weight, of the cured transparent clear coat composition. In particular embodiments, a transparent clear coat layer characterized by scratch resistance and/or resistance to UV light-induced degradation of the present invention includes in-situ formed nanoparticles in amounts in the range of about 0.1%-15%, inclusive, by weight, of the cured transparent clear coat composition. In further particular embodiments, a transparent clear coat layer characterized by scratch resistance and/or resistance to UV light-induced degradation of the present invention includes in-situ formed nanoparticles in amounts in the range of about 0.1%-5%, inclusive, by weight, of the cured transparent clear coat composition.

It is appreciated that compositions of the present invention have desirable properties in addition to color effect, scratch resistance, and resistance to undesirable UV light effects. For example, transparent coatings including in-situ formed nanoparticles of the present invention provide resistance to formation of biofilms in and on the coating. Biofilms include, for example, microorganisms such as bacteria.

Various combinations of in-situ formed nanoparticles provide transparent coatings characterized by color effect, scratch resistance, and resistance to undesirable UV light effects such as degradation of the coating.

For example, methods and compositions according to the present invention for in-situ formation of both nanoparticles which provide color effect and nanoparticles which provide scratch resistance and/or UV resistance to a transparent cured coating. In particular, such curable clear coat compositions including both a nanoparticle precursor which is a precursor for metal nanoparticles and a nanoparticle precursor which is a precursor for metal oxide nanoparticles.

Specific examples of curable clear coat compositions including both a nanoparticle precursor which is a precursor for elemental metal nanoparticles and a nanoparticle precursor which is a precursor for metal oxide nanoparticles are curable clear coat compositions including $HAuCl_4$ and TMOS; $HAuCl_4$ and $AlNO_3$; and $HAuCl_4$ and titanium tetrabutoxide.

Further examples of curable clear coat compositions including both a nanoparticle precursor which is a precursor for elemental metal nanoparticles and a nanoparticle precursor which is a precursor for metal oxide nanoparticles are curable clear coat compositions including a first nanoparticle precursor selected from selenium chloride, tin chloride, iron nitrate, antimony acetate, nickel nitrate, copper nitrate, cobalt nitrate, chromium nitrate, manganese nitrate, bismuth citrate; and a second nanoparticle precursor selected from aluminum nitrate, tetramethylorthosilicate, and titanium tetrabutoxide.

In general, a combination of a color effect along with scratch resistance and/or resistance to UV light-induced degradation in a cured clear coat composition is observed where in-situ formed nanoparticles conferring the combination of desired effects are present in a transparent clear coat layer of the present invention in amounts in the range of about 0.1%-30%, inclusive, by weight, of the cured transparent clear coat composition. Thus, for example, in particular embodiments, a transparent clear coat layer characterized by a color effect as well as scratch resistance and/or resistance to UV light-induced degradation of the present invention includes in-situ formed metal nanoparticles and in-situ formed metal oxide nanoparticles each independently in amounts in the range of about 0.1%-30%, inclusive, by weight, of the cured transparent clear coat composition, wherein the total amount of nanopaticles is in the range of about 0.1%-30%, inclusive, by weight, of the cured transparent clear coat composition. In a particular example, a transparent clear coat layer characterized by a color effect as well as scratch resistance and/or resistance to UV light-induced degradation of the present invention includes in-situ formed metal oxide nanoparticles in amounts in the range of about 0.1%-15%, inclusive, by weight, of the cured transparent clear coat composition and in-situ formed metal nanoparticles in amounts in the range of about 0.01%-5%, inclusive, by weight, of the cured transparent clear coat composition.

In further embodiments, a transparent coating containing in-situ formed nanoparticles is formed on a pigmented substrate, such that a color effect is provided by the pigmented substrate and scratch resistance and/or UV resistance, and/or another beneficial effect is provided by the in-situ formed nanoparticles.

Particular embodiments of methods and compositions according to the present invention provide a transparent coating having a color effect without addition of a pre-formed coloring agent. The term "pre-formed coloring agent" refers to a material which provides a color effect in a cured clear coat resin coating by a mechanism other than forming nanoparticles in-situ during curing of the clear coat resin coating. Examples of pre-formed coloring agents illustratively include dyes, pigments and exogenously formed nanoparticles, wherein the exogenously formed nanoparticles are formed and later mixed into a curable clear coat resin composition.

Thus, in preferred embodiments, a transparent coating according to the present invention is substantially free of exogenously formed nanoparticles. The term "exogenously formed nanoparticles" refers to nanoparticles providing a desired property such as a color effect, resistance to deleterious effects of UV light and/or scratch resistance to a transparent cured clear coat layer wherein the nanoparticles are not formed in-situ during curing of a clear coat composition.

The phrase "substantially free of exogenously formed nanoparticles" as used herein refers to a curable clear coat composition or cured clear coat composition of the present invention which has 1 mg/kg or less of exogenously formed nanoparticles in a curable clear coat composition or cured clear coat composition.

In particular embodiments, the curable clear coat composition is substantially free of undissolved nanoparticle precursor. The phrase "substantially free of undissolved nanoparticle precursor" as used herein refers to a curable clear coat composition which has no undissolved nanoparticle precursor detectable by visual inspection.

Substantial dissolution of a nanoparticle precursor in a curable clear coat composition allows for handling of the curable clear coat resin composition containing nanoparticle precursor in a manner substantially similar to methods used for conventional curable clear coat compositions or other non-solid-containing resins for application to a substrate. In contrast, curable clear coat compositions containing nanoparticles and/or undissolved precursor material have different rheology than curable clear coat compositions without nanoparticles, necessitating adjustment of handling and application procedures, for example.

Substantial dissolution of a nanoparticle precursor is achieved by various techniques including for example optimizing the concentration of nanoparticle precursor in a curable clear coat composition, dissolving a nanoparticle precursor in a suitable solvent and/or adjusting the particle size of a solid nanoparticle precursor.

Optionally, for example, dissolution time is decreased by grinding the solid precursor materials to a fine powder and/or by vigorous stirring of the curable clear coat resin composition following addition of the solid precursor material.

A nanoparticle precursor may be dissolved in a curable clear coat composition or any component of a curable clear coat composition. Thus, for example, a nanoparticle precursor is optionally dissolved in a polymer or monomer included in a curable clear coat composition.

In a further option, a nanoparticle precursor is dissolved in a solvent which is added together with other components to form the curable clear coat composition. A solvent for dissolution of a nanoparticle precursor is any solvent compatible with the nanoparticle precursor and other components of a curable clear coat composition. Choice of a particular solvent will depend on the identity of the nanoparticle precursor and other components of the curable clear coat composition. An aqueous, non-aqueous and/or organic solvent may be used and polar solvents are preferred in particular embodiments. Illustrative, non-limiting examples of polar solvents include alcohols such as methanol, ethanol, n-butanol and 1-propanol.

Transparency of a coating according to the present invention relates both to size and distribution of in-situ formed nanoparticles in the cured clear coat resin composition. In particular embodiments, nanoparticles are substantially uniformly dispersed throughout the transparent coating. Thus, for example, a substantially uniform dispersion of nanoparticles in a transparent coating according to the present invention is characterized by few or no aggregates of nanoparticles in the coating.

The term "transparent" refers to the ability of a coating according to the present invention to transmit or partially transmit radiation. In preferred embodiments, a transparent coating substantially transmits radiation in the human visible range, about 400 nm-750 nm, inclusive. In contrast, a non-transparent coating is characterized by a metallic luster. The metallic luster exhibited by a high-density accumulation of metal nanoparticles is similar or equal to the kind of luster typically exhibited by macro-sized particles of that metal.

Thickness of a coating also affects the color achieved using a coating. Thus, coating thickness of a single layer of a curable clear coat composition including a nanoparticle precursor affects the final color effect on the substrate. In further embodiments, a color effect on a substrate is achieved by application of multiple coats of a transparent coating including in-situ formed nanoparticles on the substrate.

The appearance of the substrate also affects the color achieved. Thus, in particular embodiments, a color effect on a substrate is achieved by application of a curable clear coat composition containing a nanoparticle precursor on a pigmented substrate and curing the curable clear coat composition, forming a transparent coating containing in-situ formed nanoparticles on the pigmented substrate. A pigmented substrate may be a substrate having an inherent coloration or a coloration resulting from a pigmented coating present on the substrate. A pigmented substrate may be white, black, metallic, or any other color. A transparent coating containing in-situ formed nanoparticles includes metal nanoparticles in certain embodiments, such that a color effect provided by the transparent coating containing in-situ formed nanoparticles combines with the color effect provided by the pigmented substrate to form a combined color effect.

A method for forming a transparent coating having a color effect and/or scratch resistance on a substrate is provided including application of a curable clear coat composition including a nanoparticle precursor to a substrate.

A curable clear coat composition is generally a flowable material, typically substantially liquid, which hardens upon curing to form a protective coating.

A curable clear coat composition includes one or more types of monomers, oligomers, prepolymers, macromonomers and/or polymers. Polymers included in a curable clear coat composition optionally include copolymers, terpolymers, or other combinations. Curing of the curable clear coat composition includes polymerization and/or crosslinking such as polymerization and/or crosslinking of monomers, oligomers, prepolymers, macromonomers and/or polymers.

Suitable polymers illustratively include aminoplasts, melamine formaldehydes, carbamates, polyurethanes, polyacrylates, epoxies, polycarbonates, alkyds, vinyls, polyamides, polyolefins, phenolic resins, polyesters, polysiloxanes; and combinations of any of these.

The term "monomer" refers to molecules which are combined by any of various polymerization processes to form a larger molecule, such as an oligomer, macromonomer or polymer. Polymerization processes illustratively include condensation polymerization and addition polymerization.

In particular embodiments, a curable clear coat composition is cured to produce a thermoset polymer.

A curable clear coat composition optionally includes one or more catalysts.

In particular embodiments, a polymer which is a clear coat resin included in a curable clear coat composition is crosslinkable. For example, a crosslinkable polymer has a functional group characteristic of a crosslinkable polymer. Examples of such functional groups illustratively include acetoacetate, acid, amine, carboxyl, epoxy, hydroxyl, isocyanate, silane, and vinyl.

A crosslinking agent is optionally included in a curable clear coat composition. A particular crosslinking agent is selected depending on the particular resin included in the curable clear coat composition. Examples of suitable crosslinking agents illustratively include compounds having functional groups such as isocyanate functional groups, epoxy functional groups, and acid functionality.

The curable clear coat composition is cured under selected curing conditions to form a transparent coating which includes in-situ formed nanoparticles, providing a color effect, scratch resistance and/or UV resistance.

Curing modalities are those typically used for conventional curable clear coat compositions including a resin.

For example, thermal curing is used in particular embodiments. A thermal polymerization initiator is included in a curable clear coat composition to form a transparent coating according to embodiments of the present invention. Thermal polymerization initiators include free radical initiators such as organic peroxides and azo compounds. Examples of organic peroxide thermal initiators include benzoyl peroxide, dicumylperoxide, and lauryl peroxide. An exemplary azo compound thermal initiator is 2,2'-azobisisobutyronitrile.

Optionally, a curable clear coat composition is cured by exposure to actinic radiation, such as ultraviolet, electron beam, microwave, visible, infrared, or gamma radiation.

Curing may include evaporation of a solvent in particular compositions.

In particular embodiments, a photopolymerization initiator and/or photosensitizer is included in a curable clear coat composition. Examples include benzoin, benzoin methyl ether, benzoin ethyl ether, benzoin isopropyl ether, benzoin n-butyl ether, benzoin isobutyl ether, 2-methyl-anthraquinone, 2-ethylanthraquinone, 2-tertiary-butylanthraquinone, 2-aminoanthraquinone, 1-hydroxycyclohexylphenylketone, acetophenone, dimethylacetophenone, 2,2-dimethoxy-2-phenylacetophenone, 2,2-diethoxy-2-phenylacetophenone, 2-hydroxy-2-methyl-1-phenylpropane-1-one, 4-(2-hydroxyethoxy)phenyl 2-(hydroxy-2-propyl)ketone, 2,4-dimethylthioxanthone, 2,4-diethylthioxanthone, 2-chlorothioxanthone, 2,4-dimethylthioxanthone, 2,4-diethylthioxanthone, 2-methyl-1-[4-(methylthio)-phenyl]-2-morpholinopropane-1-one,
benzophenone, p-phenylbenzophenone, 4,4'-diethylaminobenzophenone, dichlorobenzophenone, 2-methylthioxanthone, 2-ethylthioxanthone, 2-chlorothioxanthone, 2,4-dimethylthioxanthone, 2,4-diethylthioxanthone, aromatic onium salts such as sulfonium, iodonium, and phosphonium, specific non-limiting examples of which include diphenyliodonium hexafluoroarsenate, diphenyliodonium hexafluorophosphate, diphenyliodonium trifluoromethanesulfonate, tri-p-tolylsulfonium hexafluorophosphate, tri-p-tolylsulfonium trifluoromethanesulfonate, tribromomethylphenylsulfone, and triphenylsulfonium tetrafluoroborate.

A curable clear coat resin composition optionally includes any of various additives for modifying the properties of the curable clear coat composition and/or cured transparent coating. Illustrative examples of such additives include a UV absorbing agent, a plasticizer, a wetting agent, a preservative, a surfactant, a lubricant, and an additive to increase sag resistance.

Methods of forming a transparent clear coat coating including in-situ formed nanoparticles according to particular embodiments of the present invention includes application of a curable clear coat composition containing one or more nanoparticle precursors to a substrate.

Application of a curable clear coat composition including a nanoparticle precursor is accomplished by any of various methods illustratively including spray coating, dip coating, flow coating, roller coating and brush coating.

A substrate is any of various substrates to which a transparent color effect and/or scratch resistant coating is advantageously applied. For example, a substrate is a sheet material. In a further example, a substrate is a vehicle part, such as a vehicle body panel. In some embodiments, at least a portion of a substrate is transparent. For example, a transparent sheet material for use in a window or a formed article such as lenses for eyeglasses.

Substrates for use according to the present invention include, but are not limited to, metal substrates, plastic substrates and glass substrates.

A substrate optionally includes a coating such as a primer, a primer-surfacer, a primer-sealer, a basecoat, an adhesion promoting layer; or a combination of any of these or other surface treatment coatings.

Embodiments of inventive compositions and methods are illustrated in the following examples. These examples are provided for illustrative purposes and are not considered limitations on the scope of inventive compositions and methods.

EXAMPLES

Example 1

In this example gold nanoparticles are generated in-situ in the polymer clear coat layer during curing or baling at a temperature in the range of about 100-200° C. This temperature range is based on the manufacturer's recommended ideal curing temperature for the clear coat formulation of 140° C.

Hydrogen tetrachloroaurate, $HAuCl_4$, is a nanoparticle precursor material dissolved in a clear coat resin composition in this example. $HAuCl_4$, is dissolved in 10 milliliters of curable clear coat resin composition by stirring for 5-10 minutes to achieve a concentration of 0.002M of the Au nanoparticle precursor material.

Samples of resulting curable clear coat resin material including the gold nanoparticle precursor are applied as a thin film approximately 100 microns by spray coating a substrate with the curable clear coat resin material including the gold nanoparticle precursor and curing by heating with a heat gun or in a convection oven at a temperature in the range of about 100-200° C. In some cases, the curable clear coat resin and gold nanoparticle precursor mix is applied to a substrate having a white basecoat, while in other tests, the substrate has no basecoat.

It is noted that the clear coat resin material including the nanoparticle precursor does not show color effects until after curing the clear coat resin, in this example by thermal curing. Following curing, the cured material includes gold nanoparticles and has various pale or more intense red or blue color effects depending on the characteristics, particularly size, of the gold nanoparticles formed. Cured material which is transparent and has a color effect includes highly dispersed nanoparticles having a particle size in the range of about 1-100 nm. Variations in curing temperature and/or curing time produce different particle size and resultant color effect variations.

The effect of nanoparticle size on color is demonstrated by noting the color of samples of cured material produced in various conditions and measuring nanoparticle size. In particular, detailed insight into the spatial and structural arrangement of nanoparticles that form in-situ in the clear coat resin including nanoparticle precursor material during curing is analyzed through the use of high resolution transmission electron microscopy (TEM), scanning transmission electron microscopy (STEM), x-ray diffraction mapping of selected clear coat materials and/or 3-D tomography investigations at the nanoscale using both TEM and STEM applications.

In one example, a sample of transparent cured material including gold nanoparticles and having a pale blue color effect when the cured material is present on a substrate in a layer having a thickness of about 40 microns is analyzed. The sample is mounted onto TEM copper grids that are equipped with lacy carbon supports. FIG. 1 is a TEM image of a region of the sample of transparent cured material including in-situ formed nanoparticles. The image shows dispersed spherical gold nanoparticle inclusions which have a narrow size distribution of about 10-30 nm.

Figure 2:
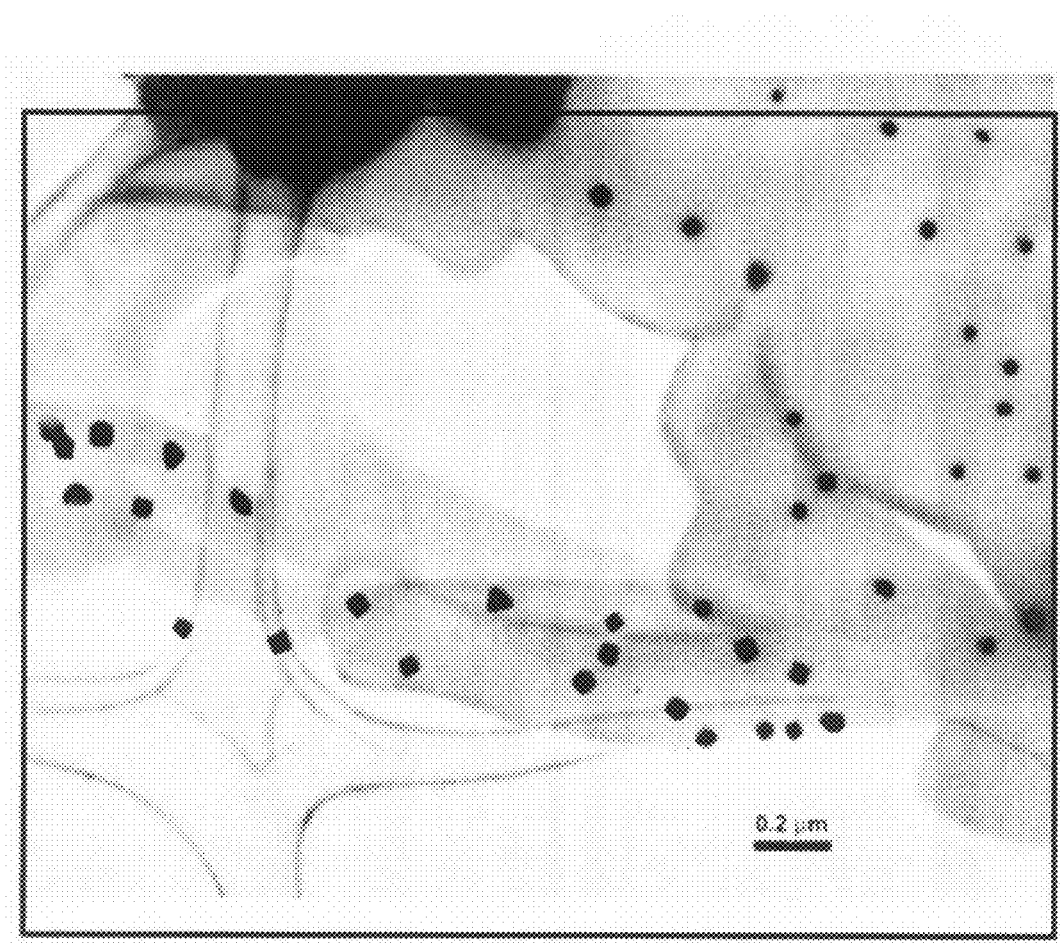
FIG. 2 shows a TEM image of a sample of transparent cured material including in-situ formed gold nanoparticles.

FIG. 2 shows an example of a TEM image of a sample of transparent cured material including in-situ formed gold nanoparticles which has a more intense blue color than that described above. The sample shown in FIG. 2 includes gold nanoparticles having sizes in the range of about 20-50 nm. These nanoparticles are characterized by well-formed crystal habits including octagons, squares and triangles.

Analysis of samples of cured material including gold nanoparticles which had a pale or intense red color effect indicates that smaller gold particles, in the range of about 1-10 nm, are present in these samples.

In-situ formed nanoparticle size is a function of factors including precursor concentration, curing temperature and duration of exposure to curing conditions. In general, higher precursor concentration, higher curing temperature and longer duration of exposure to curing conditions results in larger nanoparticle sizes. For example, increasing gold nanoparticle size is observed with increasing $HAuCl_4$ concentrations of 0.001M, 0.002M and 0.005M.

Figure 3:
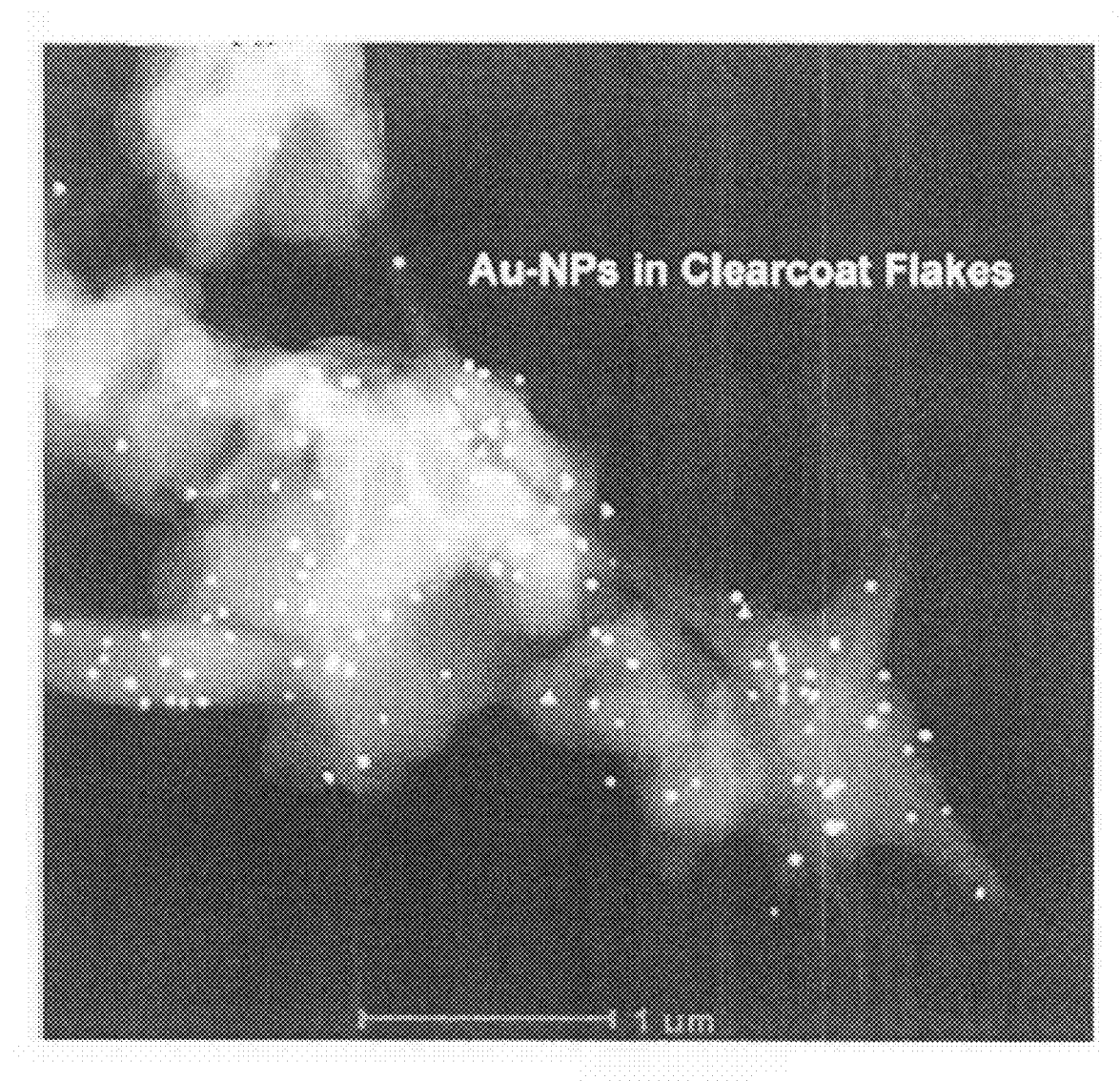
FIG. 3 shows an image from STEM analysis of various samples showing that gold nanoparticles are surrounded by the clear coat resin matrix.

FIG. 3 shows an image from STEM analysis of various samples showing that gold nanoparticles are surrounded by the clear coat resin matrix. There is no gap, space or shrinkage area noticeable at the interface of polymer and metal particles. In addition, analysis shows the nanoparticles to be homogeneously dispersed.

Several nanoparticles in several samples are identified in XRD spectra as metallic gold nanoparticles. Thus, the nanoparticles are small gold inclusions that formed from the precursor material during curing of the clear coat resin composition.

Gold nanoparticles in a sample of cured material vary from about 5-100 nm depending on the curing conditions used, such as different nanoparticle precursor concentration, curing temperatures, curing duration and curing methods such as UV curing etc., which is true for curing at single temperatures and multiple temperature ranges. A narrow size distribution of nanoparticles always results in a particular color play.

A 3-D scan is performed in a TEM to show the three dimensional placement of the in-situ formed gold nanoparticles inside the cured clear coat resin matrix. In this analysis, a sample is rotated on a TEM stage in order to view nanoparticles in the cured clear coat resin matrix from different angles. The analysis shows that some gold nanoparticles have cube or octahedron shapes. Some nanoparticles which appear triangular in 2-D TEM analysis have octagonal or cubic shapes when viewed in 3-D. This analysis again shows that the gold nanoparticles and cured clear coat resin matrix are in tight contact and no space, gap or interfacial area is present between the cured clear coat resin matrix and nanoparticles viewed. Without wishing to be bound by theory, it is believed that gold ions migrate in the uncured liquid clear coat resin composition but repel each other due to surface charge until reduction occurs during onset of polymerization. Neighboring ions become reduced simultaneously and precipitate as gold nanoparticles which grow until the matrix hardens. Again, without wishing to be bound by theory, it is believed that the polymerization process in a curable clear coat composition leads to a "forced" internal reducing environment, reducing or eliminating the need for addition of reducing agents to a curable clear coat composition. It is appreciated that this polymerization process results in no gap between the polymer matrix and the in-situ formed nanoparticles.

Example 2

Color intensity increases with layer thickness. One, two, three, four or five layers of a curable clear coat resin composition including the gold nanoparticle precursor hydrogen tetrachloroaurate at a concentration of 0.002 M are applied to a substrate to demonstrate effects of an increase in thickness of layered material. In this example, a five layer material is five times thicker than a one layer material. Even after multiple layering has been applied to a glass surface, the transparency of the coating does not noticeably decrease with increasing number of layers and total thickness of the cured layered material. The color intensifies with increasing number of layers and total thickness of the layered material because there are more Au—NPs available in the path of incoming light which results in enhanced plasmon-induced coloration.

Example 3

Table 1 illustrates amounts of particular gold-, selenium- and tin-containing precursors dissolved in a curable clear coat composition. A precursor of gold nanoparticles in the form of hydrogen tetrachloroaurate, $HAuCl_4$, is dissolved in 10 milliliters of curable clear coat resin composition by stirring for 5-10 minutes to achieve a concentration of 0.002M Au nanoparticle precursor, $HAuCl_4$, in curable clear coat resin, CC. Fine powders of $SeCl_4$ and $SnCl_2$ are added and stirred until dissolved in the curable clear coat resin composition. $SeCl_4$ and $SnCl_2$ are added in various amounts ranging from 0.001-0.010 grams for $SeCl_4$ and 0.001-0.100 grams for $SnCl_2$.

TABLE 1

| Sample ID | Concentration of Au Precursor in CC | Additional Metal Nanoparticle Precursor $SeCl_4$ | Additional Metal Nanoparticle Precursor $SnCl_2$ |
| --- | --- | --- | --- |
| 1 | 0.002 M | 0.001 g | 0.001 g |
| 2 | 0.002 M | 0.005 g | 0.001 g |
| 3 | 0.002 M | 0.010 g | 0.001 g |
| 4 | 0.002 M | 0.001 g | 0.010 g |
| 5 | 0.002 M | 0.005 g | 0.010 g |
| 6 | 0.002 M | 0.010 g | 0.010 g |
| 7 | 0.002 M | 0.001 g | 0.100 g |
| 8 | 0.002 M | 0.005 g | 0.100 g |
| 9 | 0.002 M | 0.010 g | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that Samples 1-9 appeared transparent and colored. As detailed in Table 1, the concentration of the Au-precursor in the clear coat resin is the same for Samples 1-9, and the concentration of $SeCl_4$ and $SnCl_2$ varies in these samples. The transparent coating formed by curing these samples shows that with increasing the concentration of the additional metal nanoparticle precursor $SeCl_4$ in Samples 1-3 and adding a constant amount of $SnCl_2$ in Samples 1-3 a color change was observed as follows: Cured Samples 1 and 2 are pinkish red while cured Sample 3 with the highest concentration of $SnCl_2$ is a transparent grayish hue without the pinkish hue. By increasing the amount of the metal nanoparticle precursor $SnCl_2$ by 10 fold, from 0.001 g to 0.010 g, and varying the amount of $SeCl_4$ in the range of 0.001 to 0.010 g, the cured Samples 4, 5 and 6 have a grayish hue with a minor pinkish component. By increasing the addition of the metal nanoparticle precursor $SnCl_2$ by another 10 fold, from 0.01 g to 0.1 g and varying the concentration of $SeCl_4$ from 0.001 to 0.010 g the cured Samples 7, 8 and 9 have a grayish-brown hue. The intensity of the transparent brown color component is more pronounced in cured Sample 9. The shape of the gold nanoparticles ranges from semi-spherical to triangular in shape in Samples 1-9. The observed nanoparticle size range in Samples 1-9 was about 5-30 nm.

In samples in which selenium is included in the curable clear coat composition in addition to gold precursor, visual inspection of the cured material showed a transparent grayish color effect. STEM analysis of cured material of Sample 3 identified in Table 1 demonstrates that only one size range of gold nanoparticle is formed in-situ in this sample.

Example 4

Table 2 illustrates amounts of particular iron-, tin- and gold-containing precursors dissolved in a clear coat in this example. Hydrogen tetrachloroaurate is dissolved in 10 milliliters of curable clear coat composition by stirring for 5-10 minutes to achieve a concentration of 0.002M Au nanoparticle precursor, $HAuCl_4$, in curable clear coat resin. Fine powders of $Fe(NO_3)_3$ and $SnCl_2$ are added and stirred until dissolved in the curable clear coat composition. $Fe(NO_3)_3$ and $SnCl_2$ are added in various amounts ranging from 0.001-0.100 grams for $Fe(NO_3)_3$ and 0.001-0.100 grams for $SnCl_2$.

TABLE 2

| Sample ID | Concentration of Au Precursor in CC | Additional Metal Nanoparticle Precursor $Fe(NO_3)_3$ | Additional Metal Nanoparticle Precursor $SnCl_2$ |
| --- | --- | --- | --- |
| 10 | 0.002 M | 0.001 g | 0.001 g |
| 11 | 0.002 M | 0.010 g | 0.001 g |
| 12 | 0.002 M | 0.100 g | 0.001 g |
| 13 | 0.002 M | 0.001 g | 0.010 g |
| 14 | 0.002 M | 0.010 g | 0.010 g |
| 15 | 0.002 M | 0.100 g | 0.010 g |
| 16 | 0.002 M | 0.001 g | 0.100 g |
| 17 | 0.002 M | 0.010 g | 0.100 g |
| 18 | 0.002 M | 0.100 g | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that Samples 10-18 gave various shades of transparent purples, beiges, browns and pale reds. The purple color effect, observed in cured Samples 10-127 deepens with increasing amount of added $Fe(NO_3)_3$ precursor while the amount of the precursor $SnCl_2$ is constant. The beige to brown color transition observed in Samples 13-15 is caused by increasing the amount of added precursor $Fe(NO_3)_3$ in the presence of 10-fold more of the precursor $SnCl_2$, compared to the amount present in cured Samples 10-12. Another 10-fold increase in the amount of the precursor $SnCl_2$ added results in a pink color, cured Sample 16, to pale red color formation, cured Samples 17 and 18.

Nanoparticle size and shape: The purple color play in cured Samples 10-12 is associated with nanoparticles ranging from 5-70 nm. These were observed to have preferentially triangular shape. The beige and brown color play seen in cured Samples 13-15 is associated with nanoparticles that are ranging from 5-30 nm in size in these samples, and the shape of the smaller particles is semi-spherical with octagons and squares present. The pale red color of Samples, 17 and 18 is associated with predominantly semi-spherical particles with a maximum size of ~20 nm.

Cured Sample 18 has a bluish-red color caused by the addition of a iron nanoparticle precursor and a tin nanoparticle precursor in addition to the gold nanoparticle precursor as shown in Table 2. TEM and STEM analyses of cured Sample 18 are performed to characterize nanoparticles formed in-situ during curing of the clear coat composition containing the nanoparticle precursors.

Figure 4:
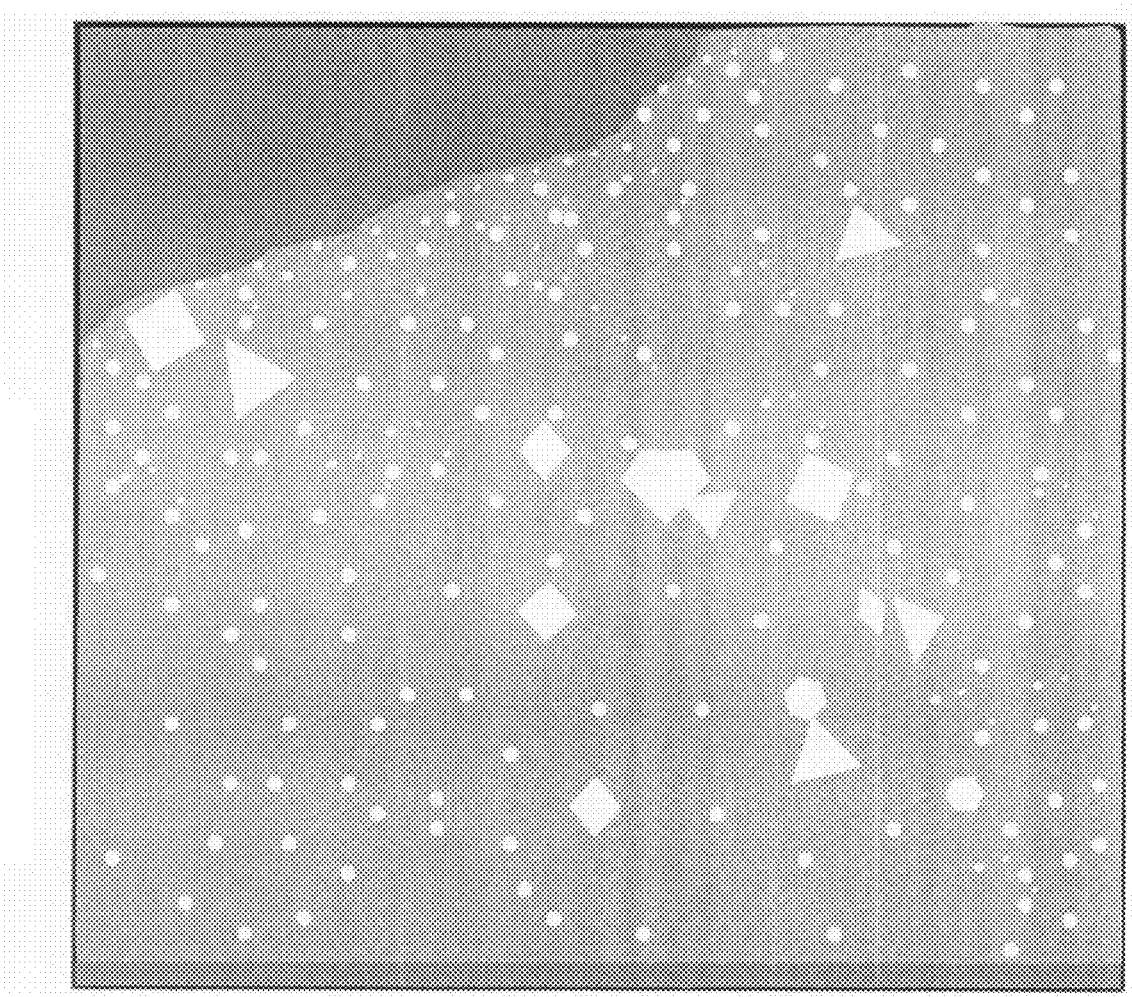
FIG. 4 shows an STEM image of a cured clear coat composition including two types of in-situ formed nanoparticles having different size ranges and shapes.
Figure 5:
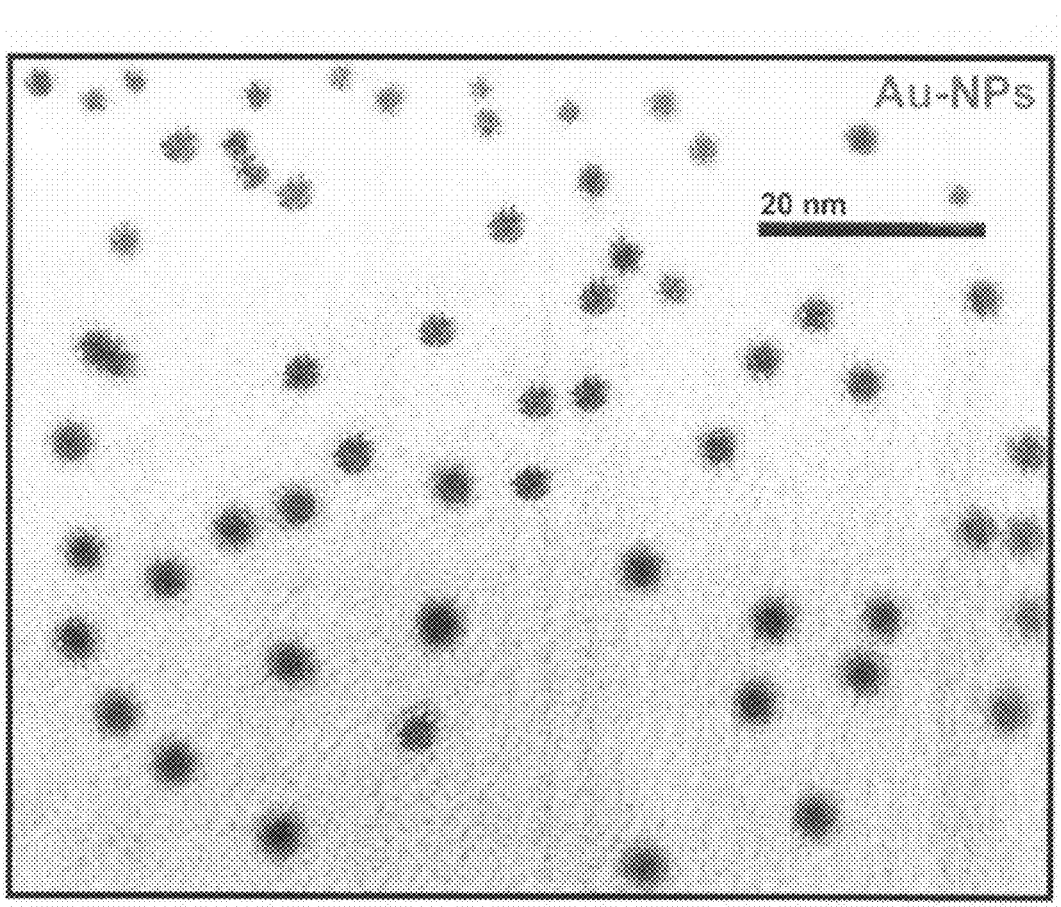
FIG. 5 shows a TEM image of the cured clear coat composition including two types of in-situ formed nanoparticles having different size ranges shown in FIG. 4, further showing that the smaller particles are spherical or triangular in shape.
Figure 6:
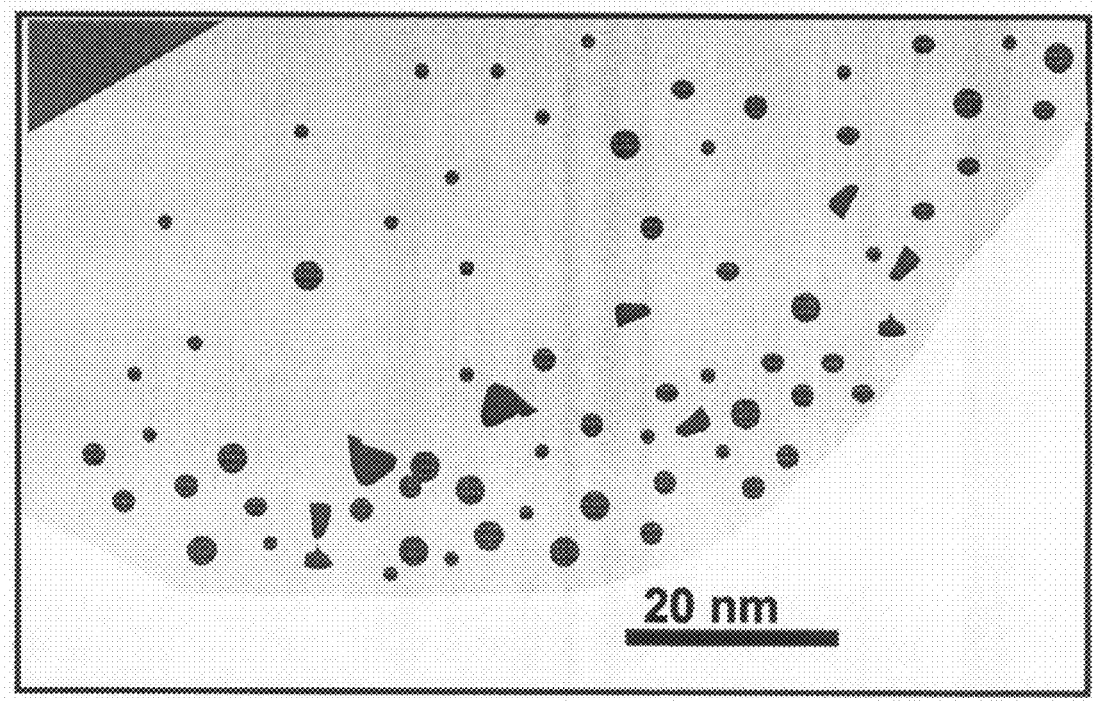
FIG. 6 shows a high resolution TEM image of the cured clear coat composition including two types of in-situ formed nanoparticles having different size ranges shown in FIG. 4, further showing that the smaller particles are spherical or triangular in shape.

FIG. 4 is an STEM image of cured Sample 18 show two types of nanoparticles that have different size ranges. Larger particles form crystal habits, including triangles, cubes and octagons. These particles have sizes in the range of about 20-60 nm. Smaller particles present in the sample have a size in the range of about 3-5 nm and are well dispersed within the matrix of the cured clear coat resin composition. FIG. 5 is a TEM image of Sample 18 showing that the smaller particles appear to be spherical or triangular in shape. This figure further illustrates the distribution of the particles in the clear coat matrix, the light gray background is the polymer matrix in this figure and the dark gray inclusions are the nanoparticles. STEM analysis of the smaller particles shows that these particles include gold and therefore appear to be gold nanoparticles. FIG. 6 is a high resolution TEM image of Sample 18 showing that the smaller particles appear to be spherical or triangular in shape.

Example 5

Table 3 illustrates amounts of particular gold- and iron-containing precursors dissolved in a clear coat resin composition. Hydrogen tetrachloroaurate is dissolved in 10 milliliters of curable clear coat composition by stirring for 5-10 minutes to achieve a concentration of 0.005M Au nanoparticle precursor, $HAuCl_4$, in curable clear coat resin. Fine powders of $Fe(NO_3)_3$ are added and stirred until dissolved in the curable clear coat composition. $Fe(NO_3)_3$ is added in various amounts ranging from 0.001-0.100 grams.

TABLE 3

| Sample Id | Concentration of Au Precursor in CC | Additional Metal Nanoparticle Precursor $Fe(NO_3)_3$ |
|---|---|---|
| 19 | 0.005 M | 0.001 g |
| 20 | 0.005 M | 0.005 g |
| 21 | 0.005 M | 0.010 g |
| 22 | 0.005 M | 0.050 g |
| 23 | 0.005 M | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that Samples 19-23 are various shades of transparent purples, greys and black. Cured Samples 19-23 were formed from a clear coat resin composition including 0.005M gold-containing precursor. A systematic increase in the amount of added $Fe(NO_3)_3$ results in transparent purple color, Sample 19; transparent bluish-purple color, Samples 20 and 21; transparent grayish blue color, Sample 22; and transparent dark grey color, Sample 23. Nanoparticle size for cured Samples 19-23 ranged from 5-70 nm. The purple and bluish purple samples have triangular particles.

Example 6

In this example, a gold nanoparticle precursor and an alumina nanoparticle precursor are dissolved into a curable clear coat composition. The curable clear coat composition containing the dissolved precursors is cured to form a coating including gold and alumina nanoparticles, providing a transparent coating having a color effect and increased scratch resistance compared to a similar composition without nanoparticles.

Table 4 illustrates amounts of particular gold- and aluminum-containing precursors dissolved in the clear coat resin composition. Hydrogen tetrachloroaurate is dissolved in 10 milliliters of curable clear coat resin composition by stirring for 5-10 minutes to achieve a concentration of 0.005M Au nanoparticle precursor, $HAuCl_4$, in curable clear coat resin. Fine powders of $Al(NO_3)_3$ are added and stirred until dissolved in the curable clear coat resin composition. $Al(NO_3)_3$ is added in various amounts ranging from 0.001-0.100 grams.

TABLE 4

| Sample Id | Concentration of Au Precursor in CC | Additional Metal Nanoparticle Precursor $Al(NO_3)_3$ |
|---|---|---|
| 24 | 0.005 M | 0.001 g |
| 25 | 0.005 M | 0.005 g |
| 26 | 0.005 M | 0.010 g |
| 27 | 0.005 M | 0.050 g |
| 28 | 0.005 M | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that Samples 24-28 are various shades of transparent purples, greys and black. Samples 24-28 were formed from a clear coat resin composition including 0.005M gold nanoparticle precursor. A systematic increase in the amount of added $Al(NO_3)_3$ precursor results in transparent blue to bluish grey color in cured Samples 24-26; and pale red color in cured Samples 27 and 28. Nanoparticle sizes in cured Samples 24-28 range from 5-70 nm. The bluish samples have preferentially triangular shaped nanoparticles and tend to have larger nanoparticles compared with the nanoparticles present in the pale red color samples.

Example 7

Table 5 details amounts of an aluminum-containing precursor dissolved in clear coat resin. A fine powder of $Al(NO_3)_3$ is dissolved in 10 milliliters of curable clear coat resin composition by stirring until dissolved in the curable clear coat resin composition. $Al(NO_3)_3$ is added in various amounts ranging from 0.001-0.050 grams.

Generally, dissolution time is decreased by grinding the solid materials to a fine powder and/or vigorous stirring of the clear coat resin following addition of the solid material.

TABLE 5

| Sample ID | Additional Metal Nanoparticle Precursor Al(NO$_3$)$_3$ |
|---|---|
| 31 | 0.001 g |
| 32 | 0.005 g |
| 33 | 0.010 g |
| 34 | 0.050 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that Samples 31-34 are transparent and have no color effect. The particles occur as grains with random morphology. These samples are characterized by scratch resistance.

High resolution TEM imaging of Sample 32 following curing illustrates the distribution of alumina nanoparticles formed in-situ in the cured resin clear coat composition during curing. The particles in this sample have a slightly angular morphology but overall appear spherical. The sizes are in the range of about 5-20 nm. Nanoparticle agglomerates or clusters, that is, multiple nanoparticles in very close proximity to each other with small or no spacing between particles, are not found.

Example 8

Table 6 illustrates amounts of particular gold- and antimony-containing precursors dissolved in the clear coat resin. Hydrogen tetrachloroaurate is dissolved in 10 milliliters of curable clear coat resin composition by stirring for 5-10 minutes to achieve concentrations in the range of 0.001-0.005M Au nanoparticle precursor, HAuCl$_4$, in curable clear coat resin. Fine powders of (CH$_3$COO)$_3$Sb are added and stirred until dissolved in the curable clear coat resin composition. (CH$_3$COO)$_3$Sb is added in various amounts ranging from 0.005-0.050 grams. It is noted that (CH$_3$COO)$_3$Sb takes days to dissolve completely.

TABLE 6

| Sample ID | Concentration of Au Precursor in CC | Additional Metal Nanoparticle Precursor (CH$_3$COO)$_3$Sb |
|---|---|---|
| 38 | 0.001 M | 0.005 g |
| 39 | 0.001 M | 0.010 g |
| 40 | 0.001 M | 0.050 g |
| 41 | 0.002 M | 0.005 g |
| 42 | 0.002 M | 0.010 g |
| 43 | 0.002 M | 0.050 g |
| 44 | 0.005 M | 0.005 g |
| 45 | 0.005 M | 0.010 g |
| 46 | 0.005 M | 0.050 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 38-46 are various shades of transparent pink, rose, purples and dark blues. Cured samples 38-46 were formed from a clear coat resin composition including systematically increased amounts of Au and Sb precursors. The cured samples were transparent shades of pale pink, cured Samples 38 and 39; transparent shades purple with increasing intensity, cured Samples 40-43; transparent shades bluish purple, cured Samples 44 and 45; and transparent shades bluish grey, cured Sample 46. Nanoparticle sizes for Samples 38-46 ranged from 5-70 nm. The purple and bluish purple samples have triangular particles.

Example 9

Table 7 details amounts of particular gold- and nickel-containing precursors dissolved in the clear coat resin. Hydrogen tetrachloroaurate is dissolved in 10 milliliters of curable clear coat resin composition by stirring for 5-10 minutes to achieve concentrations in the range of 0.001-0.005M Au nanoparticle precursor, HAuCl$_4$, in curable clear coat resin. Fine powders of Ni(NO$_3$)$_2$ are added and stirred until dissolved in the curable clear coat resin composition. Ni(NO$_3$)$_2$ is added in various amounts ranging from 0.005-0.050 grams.

TABLE 7

| Sample ID | Concentration of Au Precursor in CC | Additional Metal Nanoparticle Precursor Ni(NO$_3$)$_2$ |
|---|---|---|
| 47 | 0.001 M | 0.005 g |
| 48 | 0.001 M | 0.010 g |
| 49 | 0.001 M | 0.050 g |
| 50 | 0.0025 M | 0.005 g |
| 51 | 0.0025 M | 0.010 g |
| 52 | 0.0025 M | 0.050 g |
| 53 | 0.005 M | 0.005 g |
| 54 | 0.005 M | 0.010 g |
| 55 | 0.005 M | 0.050 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 47-55 are various shades of transparent reds, oranges, purples and greys. Cured Samples 47-55 were formed from a clear coat resin composition including systematic increased amounts of Au and Ni precursors. The samples are transparent shades of pale pink, cured Samples 47 and 48; transparent shades of pale peach, cured Sample 49; transparent shades of bluish purple, cured Samples 50-52; and transparent shades of bluish grey, cured Samples 53-55. Nanoparticle size for cured Samples 47-55 ranged from 5-70 nm. The purple and bluish purple samples have triangular nanoparticles.

Example 10

Table 8 details amounts of particular gold- and copper-containing precursors dissolved in the clear coat resin. Hydrogen tetrachloroaurate is dissolved in 10 milliliters of curable clear coat resin composition by stirring for 5-10 minutes to achieve concentrations in the range of 0.001-0.005M Au nanoparticle precursor, $HAuCl_4$, in curable clear coat resin. Fine powders of $Cu(NO_3)_2$ are added and stirred until dissolved in the curable clear coat resin composition. $Cu(NO_3)_2$ is added in various amounts ranging from 0.005-0.050 grams.

TABLE 8

| Sample ID | Concentration of Au Precursor in CC | Additional Metal Nanoparticle Precursor $Cu(NO_3)_2$ |
|---|---|---|
| 56 | 0.001 M | 0.005 g |
| 57 | 0.001 M | 0.010 g |
| 58 | 0.001 M | 0.050 g |
| 59 | 0.0025 M | 0.005 g |
| 60 | 0.0025 M | 0.010 g |
| 61 | 0.0025 M | 0.050 g |
| 62 | 0.005 M | 0.005 g |
| 63 | 0.005 M | 0.010 g |
| 64 | 0.005 M | 0.050 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 56-64 are various shades of transparent reds, blues, greens, oranges, purples and greys. Cured Samples 56-64 were formed from a clear coat resin composition including systematically increased amounts of Au and Cu precursors. The samples display transparent shades of pale pink, cured Sample 56; transparent shades of pale peach, cured Sample 57; transparent shades of yellowish-green, cured Sample 58; transparent shades of reddish-purple, cured Samples 59 and 60; transparent shades of turquoise-grey, cured Sample 61; transparent shades of blue, cured Samples 62 and 63; and transparent shades of deep-turquoise, cured Sample 64. Nanoparticle size for cured Samples 56-64 ranged from 5-70 nm. The purple and bluish purple samples have triangular nanoparticles.

Example 11

Table 9 details amounts of particular gold- and cobalt-containing precursors dissolved in the clear coat resin. Au in the form of hydrogen tetrachloroaurate, $HAuCl_4$, is dissolved in 10 milliliters of curable clear coat resin composition by stirring for 5-10 minutes to achieve concentrations in the range of 0.001-0.005M Au nanoparticle precursor, $HAuCl_4$, in curable clear coat resin. Fine powders of $Co(NO_3)_2$ are added and stirred until dissolved in the curable clear coat resin composition. $Co(NO_3)_2$ is added in various amounts ranging from 0.005-0.050 grams.

TABLE 9

| Sample ID | Concentration of Au Precursor in CC | Additional Metal Nanoparticle Precursor $Co(NO_3)_2$ |
|---|---|---|
| 65 | 0.001 M | 0.005 g |
| 66 | 0.001 M | 0.010 g |
| 67 | 0.001 M | 0.050 g |
| 68 | 0.0025 M | 0.005 g |
| 69 | 0.0025 M | 0.010 g |
| 70 | 0.0025 M | 0.050 g |
| 71 | 0.005 M | 0.005 g |
| 72 | 0.005 M | 0.010 g |
| 73 | 0.005 M | 0.050 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 65-73 are various shades of transparent reds, purples and greys. Cured Samples 65-73 were formed from a clear coat resin composition including systematically increased amounts of Au and Cu precursors. The cured samples are transparent shades of pale pink, cured Samples 65 and 66; transparent shades of grayish-pink, cured Sample 67; transparent shades of purple, cured Samples 68 and 69; transparent shades of grayish purple, cured Sample 70; and transparent shades of purplish-blue, cured Samples 71-73. Nanoparticle size for cured Samples 65-73 ranged from 5-70 nm. The purple and bluish purple samples have triangular nanoparticles.

Example 12

Table 10 details amounts of particular gold- and chromium-containing precursors dissolved in the clear coat resin. Hydrogen tetrachloroaurate is dissolved in 10 milliliters of curable clear coat resin composition by stirring for 5-10 minutes to achieve a concentration of 0.005M Au nanoparticle precursor, $HAuCl_4$, in curable clear coat resin. Fine powders of $Cr(NO_3)_3$ are added and stirred until dissolved in the curable clear coat resin composition. $Cr(NO_3)_3$ is added in various amounts ranging from 0.005-0.200 grams.

TABLE 10

| Sample ID | Concentration of Au Precursor in CC | Additional Metal Nanoparticle Precursor $Cr(NO_3)_3$ |
|---|---|---|
| 86 | 0.005 M | 0.005 g |
| 87 | 0.005 M | 0.010 g |
| 88 | 0.005 M | 0.050 g |
| 89 | 0.005 M | 0.100 g |
| 90 | 0.005 M | 0.200 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 86-90 are various shades of transparent reds, purples and oranges. Cured Samples 86-90 were formed from a clear coat resin composition including a high concentration of Au precursor and systematically increased amounts of Cr precursor. The colors resulted in transparent shades of purplish-blue, cured Samples 86 and 87; transparent shades of red, cured Sample 88; and transparent shades of red with increasing yellow tint, cured Samples 89 and 90. Nanoparticle size for cured Samples 86-90 ranged from 5-70 nm. The bluish purple samples have triangular shaped nanoparticles.

Example 13

Table 11 details amounts of particular gold and bismuth-containing precursors dissolved in the clear coat resin. Hydrogen tetrachloroaurate, $HAuCl_4$, is dissolved in 10 milliliters of curable clear coat resin composition by stirring for 5-10 minutes to achieve a concentration of 0.005M Au nanoparticle precursor, $HAuCl_4$, in curable clear coat resin. Fine powders of Bi-citrate are added and stirred until dissolved or nearly dissolved in the curable clear coat resin composition. Bi-citrate is added in various amounts ranging from 0.005-0.100 grams. It is noted that Bi-citrate did not dissolve completely after 24 hours of stirring in this example.

TABLE 11

| Sample ID | Concentration of Au Precursor in CC | Additional Metal Nanoparticle Precursor Bi-Citrate |
|---|---|---|
| 95 | 0.005 M | 0.005 g |
| 96 | 0.005 M | 0.010 g |
| 97 | 0.005 M | 0.050 g |
| 98 | 0.005 M | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 95-98 are various shades of transparent purples. Cured Samples 95-98 were formed from a clear coat resin composition including a high concentration of Au precursor and systematically increased amounts of Bi precursor. The cured Samples 95-98 display an intense purplish-blue color. Nanoparticle size for cured Samples 95-98 ranged from 5-70 nm. The bluish samples have triangular nanoparticles.

Example 14

Table 12 details amounts of particular gold- and manganese-containing precursors dissolved in the clear coat resin. Au in the form of hydrogen tetrachloroaurate, $HAuCl_4$, is dissolved in 10 milliliters of curable resin composition by stirring for 5-10 minutes to achieve a concentration of 0.005M Au nanoparticle precursor, $HAuCl_4$, in curable clear coat resin. Fine powders of $Mn(NO_3)_2$ are added and stirred until dissolved in the curable clear coat resin composition. $Mn(NO_3)_2$ is added in various amounts ranging from 0.005-0.100 grams.

TABLE 12

| Sample ID | Concentration of Au Precursor in CC | Additional Metal Nanoparticle Precursor $Mn(NO_3)_2$ |
|---|---|---|
| 99 | 0.005 M | 0.005 g |
| 100 | 0.005 M | 0.010 g |
| 101 | 0.005 M | 0.050 g |
| 102 | 0.005 M | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 99-102 are various shades of transparent reds, purples and greys. Cured Samples 99-102 were formed from a clear coat resin composition including a high concentration of Au precursor and systematically increased amounts of Mn precursor. The cured samples display a transparent intense purplish-blue color, cured Sample 99; transparent intense reddish-purple color, cured Sample 100; transparent grayish-red color, cured Sample 101; and a transparent grey shade, cured Sample 102. Nanoparticle size for cured Samples 99-102 ranged from 5-70 nm for bluish and reddish samples.

Example 15

For Sample 74, a fine powder of $Cu(NO_3)_2$ is added to 10 milliliters of a curable clear coat resin and stirred until dissolved in the curable clear coat resin composition. $Cu(NO_3)_2$ is added in an amount of 0.1 grams.

For Sample 75, Au in the form of hydrogen tetrachloroaurate, $HAuCl_4$, is dissolved in 10 milliliters of curable clear coat resin composition by stirring for 5-10 minutes to achieve a concentration of 0.001M Au. A fine powder of $Cu(NO_3)_2$ is added and stirred until dissolved in the curable clear coat resin composition. $Cu(NO_3)_2$ is added in an amount of 0.1 grams.

Samples 74 and 75 are each applied as a thin film having a thickness of about 100 microns to a substrate with or without a white base coat and cured by beating with a heat gun or in a convection oven at a temperature in the range of about 120-180° C.

Visual examination of the cured material including nanoparticles formed in-situ in the curable clear coat composition during curing showed that cured Sample 74 produced a transparent light blue-green color effect and cured Sample 75 produced a transparent light green color effect.

Example 16

In this example, an aliquot of Sample 4, containing $HAuCl_4$, $SeCl_4$ and $SnCl_2$, is mixed with an aliquot of Sample 74 in equal amounts. The mixture is then applied to a substrate and cured. Visual examination of the cured material including nanoparticles formed in-situ in the curable clear coat composition during curing showed that the cured material gave a transparent light blue-green-grey color effect.

Example 17

In this example, an aliquot of Sample 23, containing $HAuCl_4$ and $Fe(NO_3)_3$, is mixed with an aliquot of Sample 74 in equal amounts. The mixture is then applied to a substrate and cured. It is noted that prolonged heat gun treatment causes degradation and/or combustion of the cured material.

Example 18

In addition to nanoparticle precursors added to achieve a color effect, nanoparticle precursors are optionally added to achieve scratch resistance. Table 13 details amounts of a particular nanoparticle precursor, $Al(NO_3)_3$, dissolved in the clear coat resin to form nanoparticles for transparent color effect. In addition, tetramethylorthosilicate, TMOS, provided in liquid form is included as a precursor to nanoparticles included to achieve scratch resistance. Fine powders of $Al(NO_3)_3$ are added and stirred until dissolved in 10 milliliters of the curable clear coat resin composition. TMOS is added in various amounts ranging from 0.01-0.1 grams.

TABLE 13

| Sample ID | Additional Metal Nanoparticle Precursor $Al(NO_3)_3$ | Additional Metal Nanoparticle Precursor TMOS |
| --- | --- | --- |
| 76 | 0.01 g | 0.001 g |
| 77 | 0.05 g | 0.001 g |
| 78 | 0.10 g | 0.001 g |
| 79 | 0.01 g | 0.010 g |
| 80 | 0.05 g | 0.010 g |
| 81 | 0.10 g | 0.010 g |
| 82 | 0.01 g | 0.100 g |
| 83 | 0.05 g | 0.100 g |
| 84 | 0.10 g | 0.100 g |

The samples of curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that cured Samples 76-84 are transparent and colorless. Tests for scratch resistance were performed and these samples are characterized as scratch resistant.

Example 19

In this example, compositions are described which include nanoparticle precursors which form in-situ nanoparticles conferring scratch resistance alone or in combination with nanoparticle precursors which form in-situ nanoparticles conferring a color effect. Sample TS1 is prepared by dissolution of sixteen grams of $Al(NO_3)_3$ in 25 milliliters of a solvent, n-butanol. The dissolved precursor in the solvent is then added to 800 milliliters of a clear coat resin composition and mixed until homogeneously distributed. Sample TS2 is prepared by stirring forty milliliters of TMOS into 800 milliliters of a clear coat resin composition. Sample TS3 is prepared by dissolution of $HAuCl_4$ in 800 milliliters of a clear coat resin composition to a concentration of 0.005M. Eight grams of $Al(NO_3)_3$ is dissolved in 25 milliliters of a solvent, n-butanol and the dissolved precursor in the solvent is then added to the 800 milliliters of curable clear coat resin composition containing the Au nanoparticle precursor, $HAuCl_4$, at a concentration of 0.005M. Sample TS4 is prepared by dissolution of $HAuCl_4$ in 800 milliliters of a clear coat resin composition to a concentration of 0.005M. 0.8 grams of $Fe(NO_3)_3$ is then dissolved in the 800 milliliters of clear coat resin composition containing 0.005M Au. In addition, twenty-five milliliters of n-butanol is added to adjust the viscosity of a typical clear coat.

TABLE 14

| Sample ID | Concentration of Au Precursor in CC | Additional Metal Nanoparticle Precursor |
| --- | --- | --- |
| TS1 | 0 | 16 g $Al(NO_3)_3$ |
| TS2 | 0 | 40 ml TMOS |
| TS3 | 0.005 M | 8 g $Al(NO_3)_3$ |
| TS4 | 0.005 M | 0.8 g $Fe(NO_3)_3$ |

The samples of these curable clear coat compositions including the various nanoparticle precursors are applied as a thin film having a thickness of about 100 microns to a substrate with or without a white base coat and cured by heating with a heat gun or in a convection oven at a temperature in the range of about 120-180° C.

Visual examination of the cured material including nanoparticles formed in-situ in the curable clear coat composition during curing showed that Samples TS1 and TS2 are transparent. Tests for scratch resistance were performed on Samples TS1-TS4. Samples TS1 and TS2 show scratch resistance. No scratch resistance is observed when only gold and iron nanoparticles are present, as in Sample TS4. Samples TS3 and TS4 have bluish-red color play and Sample TS3 is scratch resistant.

Example 20

TEM images of a sample prepared using a higher alumina precursor concentration show that the nanoparticles in the cured material are typically smaller than those formed using a lower alumina precursor concentration, in the range of about 3-8 nm.

Crystallinity of macro-sized alumina particles is typically associated with high hardness. Alumina particles have a hardness of 9 on the Moh's hardness scale which ranges from 1-10, diamond being a 10. High resolution TEM images of these samples show that there is a high degree of crystallinity of alumina nanoparticles as demonstrated by characteristic lattice fringes. The lattice fringes are characteristic of d-spacings for particular crystal morphologies which are used to help determine the alumina phases.

Sample TS-2 is prepared by blending 40 milliliters of TMOS, a liquid silica precursor material, into 800 milliliters of a curable clear coat resin composition. Following curing, silica nanoparticles observed in this sample using TEM show random morphologies and have a weak optical contrast next to the clear coat matrix. The size range of the silica nanoparticles was observed to be 5-70 nm based on the TEM observations which included many samples.

Example 21

In further embodiments, samples are generated which include both color-effect providing nanoparticles and scratch resistance-enhancing nanoparticles and the samples are analyzed using TEM to characterize the nanoparticles. In this example, gold nanoparticles and silica nanoparticles are formed in-situ in a cured clear coat resin composition. The silica nanoparticles are smaller than the gold nanoparticles in these samples. The gold nanoparticles are either spheres or octagons, while the oxide nanoparticles, which are amorphous silica, are characterized by random morphologies with flake-like appearance. All nanoparticles are well dispersed in the samples and show little clustering. The size range for the nanoparticles is 5-70 nm.

Figure 7:
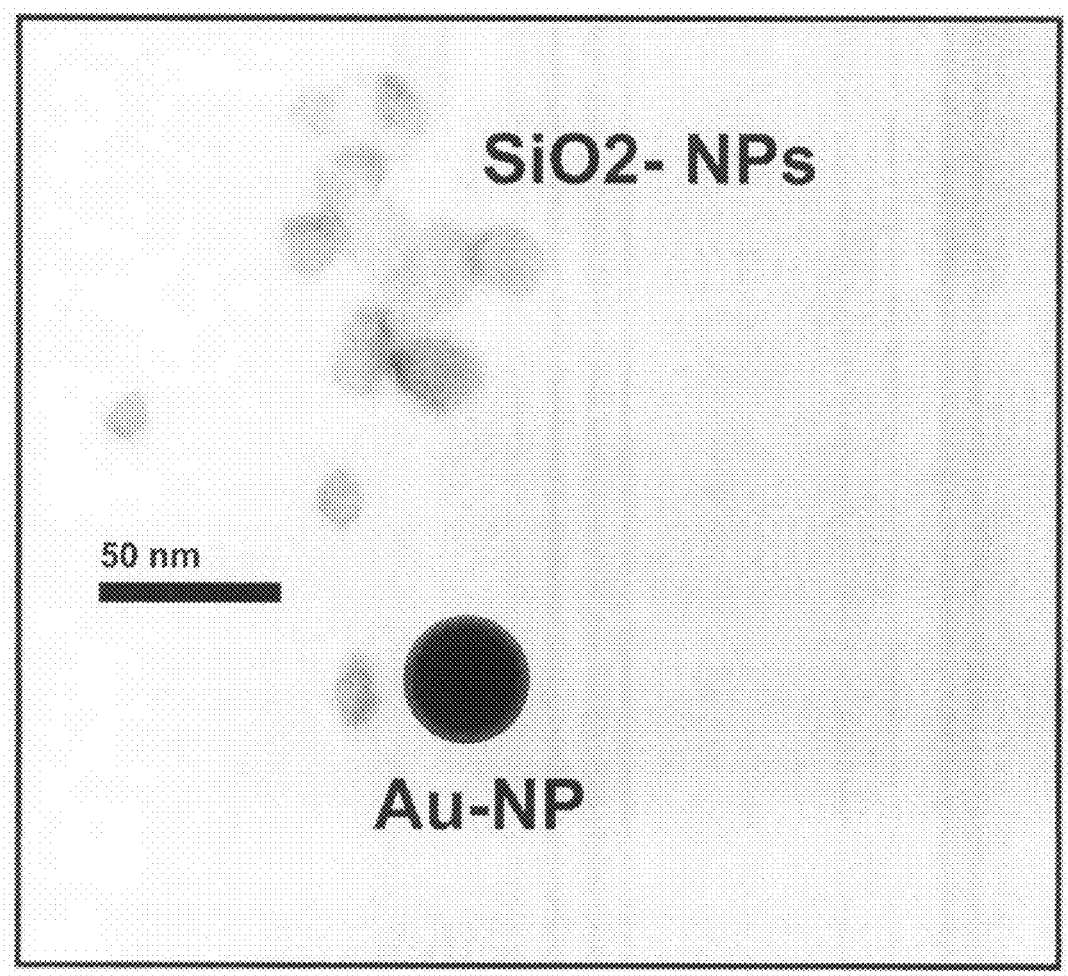
FIG. 7 shows a high resolution TEM image illustrating the inclusion of multiple in-situ formed amorphous silica nanoparticles juxtaposed to in-situ formed gold nanoparticles in a cured clear coat resin matrix.
Figure 8:
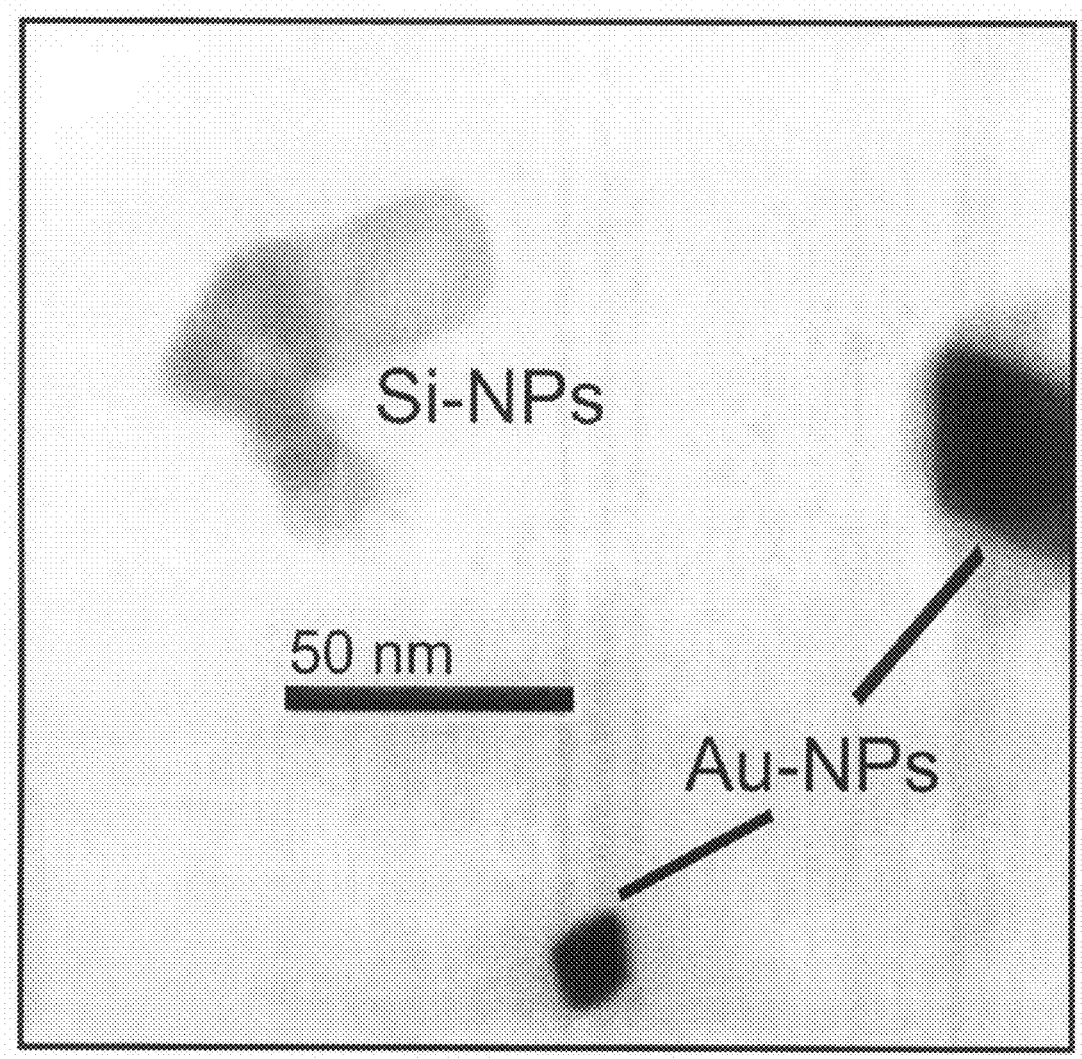
FIG. 8 shows a high resolution TEM image illustrating the inclusion of multiple in-situ formed amorphous silica nanoparticles juxtaposed to in-situ formed gold nanoparticles in a cured clear coat resin matrix.

FIGS. 7 and 8 show a high resolution TEM image illustrating the inclusion of multiple amorphous silica nanoparticles juxtaposed to gold nanoparticles in a clear coat resin matrix. The samples analyzed are prepared using a liquid silica nanoparticle precursor and a gold nanoparticle precursor. The silica particles present in FIGS. 7 and 8 have a random, flake-like morphology and appear to form in clusters. The silica particles are smaller in size than gold nanoparticles in these figures, and the silica particles have a clustering effect. The gold nanoparticle in FIG. 7 has a characteristic spherical morphology and can be identified as the black inclusion compared with the light gray silica particles. The gold particles in FIG. 8 are octagonal and can be identified as the black inclusion compared with the light gray silica particles.

Example 22

In further embodiments, equal amounts of two precursors for alumina and silica nanoparticles are included in a curable clear coat resin composition to produce a transparent cured clear coat resin composition. Following curing two types of oxide nanoparticles are observed using STEM image. Alumina nanoparticles have semi-spherical morphology while the silica nanoparticles are characterized by a flake-like morphology. Nanoparticle size ranged from 5-50 nm.

Example 23

A further provided embodiment includes three precursors for oxide nanoparticles included in a curable clear coat resin composition. Equal amounts of alumina and silica and titania precursors are dissolved in a clear coat resin composition. The composition is cured to produce a transparent coating including in-situ formed alumina, silica and titania nanoparticles.

Three nanoparticles types are identified in a sample of the cured material. The different oxide nanoparticles, alumina, silica and titania, have different morphologies and size ranges. STEM-obtained elemental XRD maps for carbon, oxygen, aluminum, titanium and silicon show that titania nanoparticles are largest and semi-spherical. Alumina forms semi-spherical particles, but smaller and better dispersed compared with titania. The silica nanoparticles formed in their characteristic flake-like morphology. Compared with titania and alumina nanoparticles, the silica nanoparticles show the most homogeneous distribution in clear coat.

Example 24

In this example, compositions are described which include nanoparticle precursors which form in-situ nanoparticles conferring UV light resistance which may be used alone or in combination with nanoparticle precursors which form in-situ nanoparticles conferring a color effect and/or nanoparticle precursors which form in-situ nanoparticles conferring a scratch resistance effect.

Table 15 shows amounts of a nanoparticle precursor Ti-tetrabutoxide dissolved in 55 milliliters of curable clear coat resin composition.

TABLE 15

| Sample ID | Nanoparticle Precursor: $Ti(OC_4H_9)_4$ |
|---|---|
| Ti-1 | 0.005 g |
| Ti-2 | 0.010 g |
| Ti-3 | 0.020 g |
| Ti-4 | 0.050 g |

Any patents or publications mentioned in this specification are incorporated herein by reference to the same extent as if each individual publication is specifically and individually indicated to be incorporated by reference.

The compositions and methods described herein are presently representative of preferred embodiments, exemplary, and not intended as limitations on the scope of the invention. Chances therein and other uses will occur to those skilled in the art. Such changes and other uses can be made without departing from the scope of the invention as set forth in the claims.

The invention claimed is:

1. A method of forming a transparent coating on a substrate, the transparent coating having a color effect, resistance to UV light-induced degradation and/or scratch resistance, comprising:
applying a curable clear coat composition comprising a first nanoparticle precursor, wherein the curable clear coat composition comprising a first nanoparticle precursor is substantially free of undissolved first nanoparticle precursor; and
curing the curable clear coat composition to form a transparent coating comprising a polymer selected from the group consisting of: aminoplasts, melamine formaldehydes, carbamates, polyurethanes, polyacrylates, epoxies, polycarbonates, alkyds, vinyls, polyamides, polyolefins, phenolic resins, polyesters, polysiloxanes; and combinations of any of these; and a plurality of in-situ formed nanoparticles having an average particle size in the range of about 1-100 nanometers, inclusive, wherein the plurality of nanoparticles confers a color effect, resistance to UV light-induced degradation and/or scratch resistance to the transparent coating.

2. The method of claim 1, wherein at least a portion of the plurality of nanoparticles is characterized by a plasmon resonance absorption in the visible range.

3. The method of claim 1, wherein the first nanoparticle precursor is a metal salt.

4. The method of claim 1, wherein the plurality of nanoparticles is a plurality of nanoparticles characterized by an amount of elemental metal in the range of about 95-100% of the total weight of the plurality of nanoparticles and wherein the plurality of nanoparticles confers a color effect to the transparent coating.

5. The method of claim 1, wherein the first nanoparticle precursor is $HAuCl_4$.

6. The method of claim 1, wherein the first nanoparticle precursor comprises a metal salt capable of being reduced under curing conditions to elemental metal.

7. The method of claim 1, wherein the first nanoparticle precursor comprises a metal selected from the group consisting of: Au, Ag, Bi, Cr, Co, Cu, Fe, Mn, Ni, Pt, Sb, Se and Sn.

8. The method of claim 1, wherein the curable clear coat composition further comprises a second nanoparticle precursor.

9. The method of claim 8, wherein the first nanoparticle precursor is $HAuCl_4$ and the second nanoparticle precursor comprises a metal selected from the group consisting of: Al, Au, Ag, Bi, Ce, Cr, Co, Cu, Fe, Mn, Ni, Pt, Sb, Se, Si, Sn and Ti.

10. The method of claim 8, wherein the first nanoparticle precursor is $HAuCl_4$ and the second nanoparticle precursor is selected from the group consisting of: selenium chloride, tin chloride, iron nitrate, antimony acetate, nickel nitrate, copper nitrate, cobalt nitrate, chromium nitrate, manganese nitrate, bismuth citrate, aluminum nitrate, tetramethylorthosilicate, titanium tetrabutoxide, and combinations thereof.

11. The method of claim 8, wherein the second nanoparticle precursor is substantially dissolved in the curable clear coat composition.

12. The method of claim 1, wherein the curable clear coat composition is substantially free of nanoparticles.

13. The method of claim 1, wherein the nanoparticles are substantially uniformly dispersed throughout the transparent coating.

* * * * *